(12) United States Patent
Fuerle

(10) Patent No.: US 6,893,369 B2
(45) Date of Patent: May 17, 2005

(54) CONTINUOUSLY VARIABLE DIAMETER DRIVE WHEEL AND CONTINUOUSLY VARIABLE RATIO TRANSMISSION MADE THEREWITH

(76) Inventor: Richard D. Fuerle, 1711 W. River Rd., Grand Island, NY (US) 14072

( * ) Notice: Subject to any disclaimer, the term of this patent is extended or adjusted under 35 U.S.C. 154(b) by 169 days.

(21) Appl. No.: 10/249,407

(22) Filed: Apr. 7, 2003

(65) Prior Publication Data

US 2004/0198542 A1 Oct. 7, 2004

(51) Int. Cl.$^7$ .................... F16H 55/30; F16H 55/12; F16H 55/52
(52) U.S. Cl. .................. 474/163; 474/162; 474/56
(58) Field of Search .................. 474/162–164, 474/902, 47–49, 55–57, 152, 148; D8/360

(56) References Cited

U.S. PATENT DOCUMENTS

| | | | | |
|---|---|---|---|---|
| 1,633,746 A | * | 6/1927 | Jereczek | 474/163 |
| 2,161,913 A | * | 6/1939 | Doyle | 474/163 |
| 3,867,851 A | * | 2/1975 | Gregory et al. | 474/56 |
| 4,030,373 A | * | 6/1977 | Leonard | 474/53 |
| 4,129,044 A | * | 12/1978 | Erickson et al. | 474/55 |
| 4,516,960 A | * | 5/1985 | Rathert | 474/49 |

FOREIGN PATENT DOCUMENTS

EP 061100 A1 * 8/1994 ........... F16H/55/30

* cited by examiner

Primary Examiner—Marcus Charles
(74) Attorney, Agent, or Firm—Richard D. Fuerle

(57) ABSTRACT

A drive wheel for pulling a chain has a diameter that can be changed continuously as the drive wheel rotates. The drive wheel has a drive shaft and there are at least 2 chain-engaging means (teeth or blades) positioned around the drive shaft for engaging a chain. The wheel has a number of modules that support the chain-engaging means and permit the chain-engaging means to move slightly in a circumferential direction a distance sufficient to engage the chain. Module locks prevent such movement when the chain is engaged, but permit it when the chain is not engaged. Extenders connect the modules to the drive shaft and can change the distance between the modules and the drive shaft while the drive shaft is rotating. Extender locks prevent the extenders from changing that distance when the chain is engaged but permit such change when the chain is not engaged. A transmission can be made by connecting the drive wheel to a sprocket wheel with a chain.

20 Claims, 25 Drawing Sheets

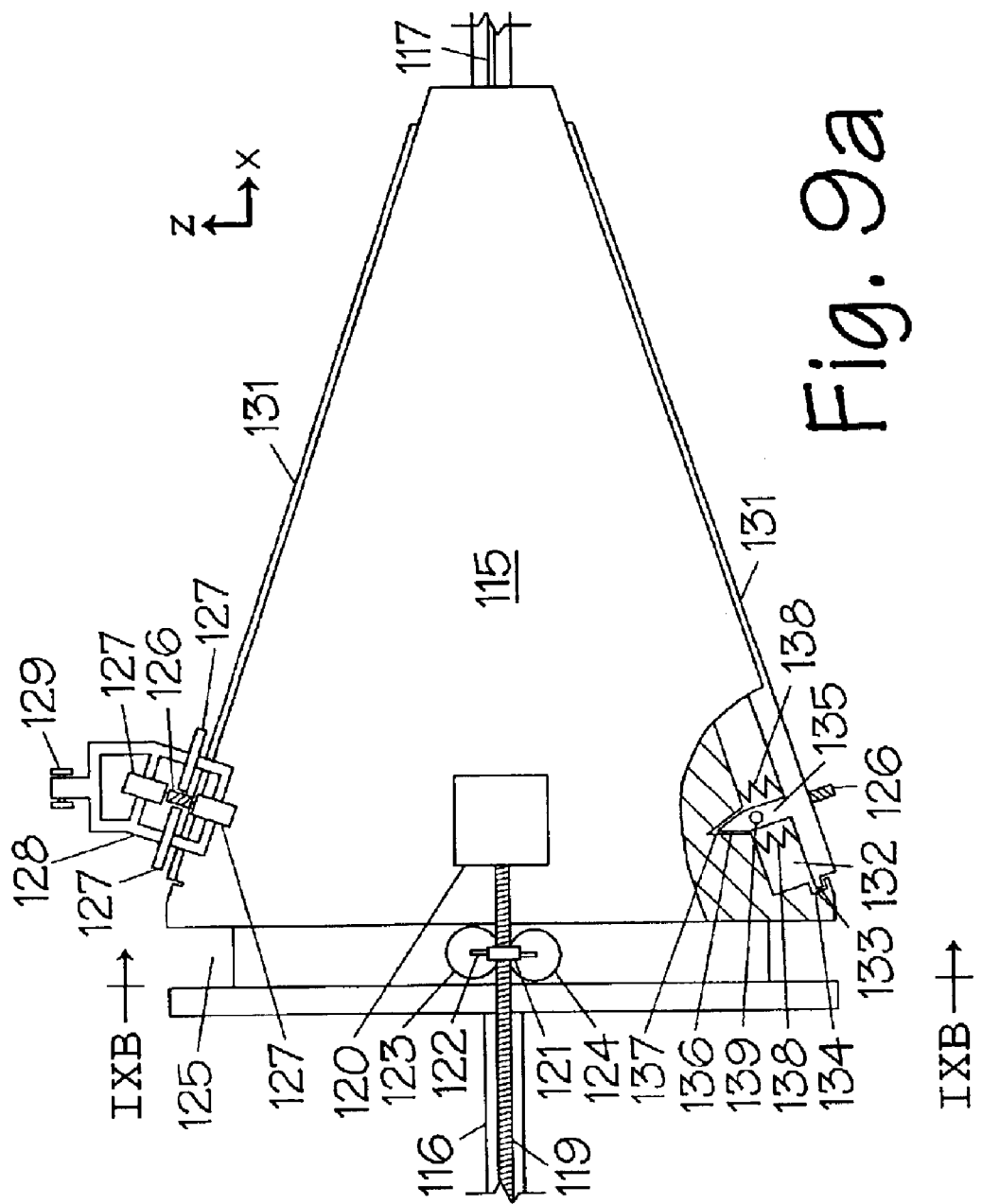

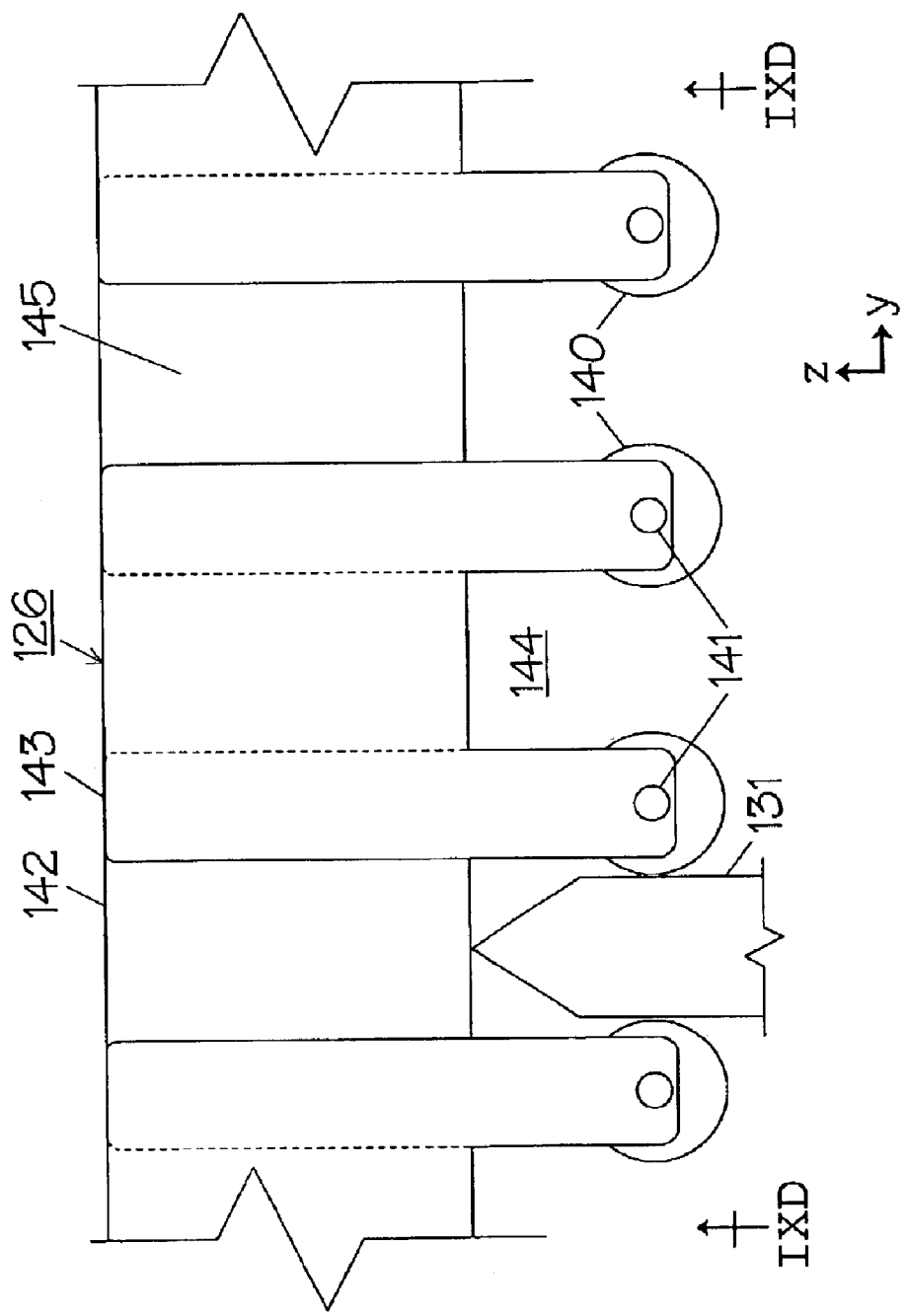

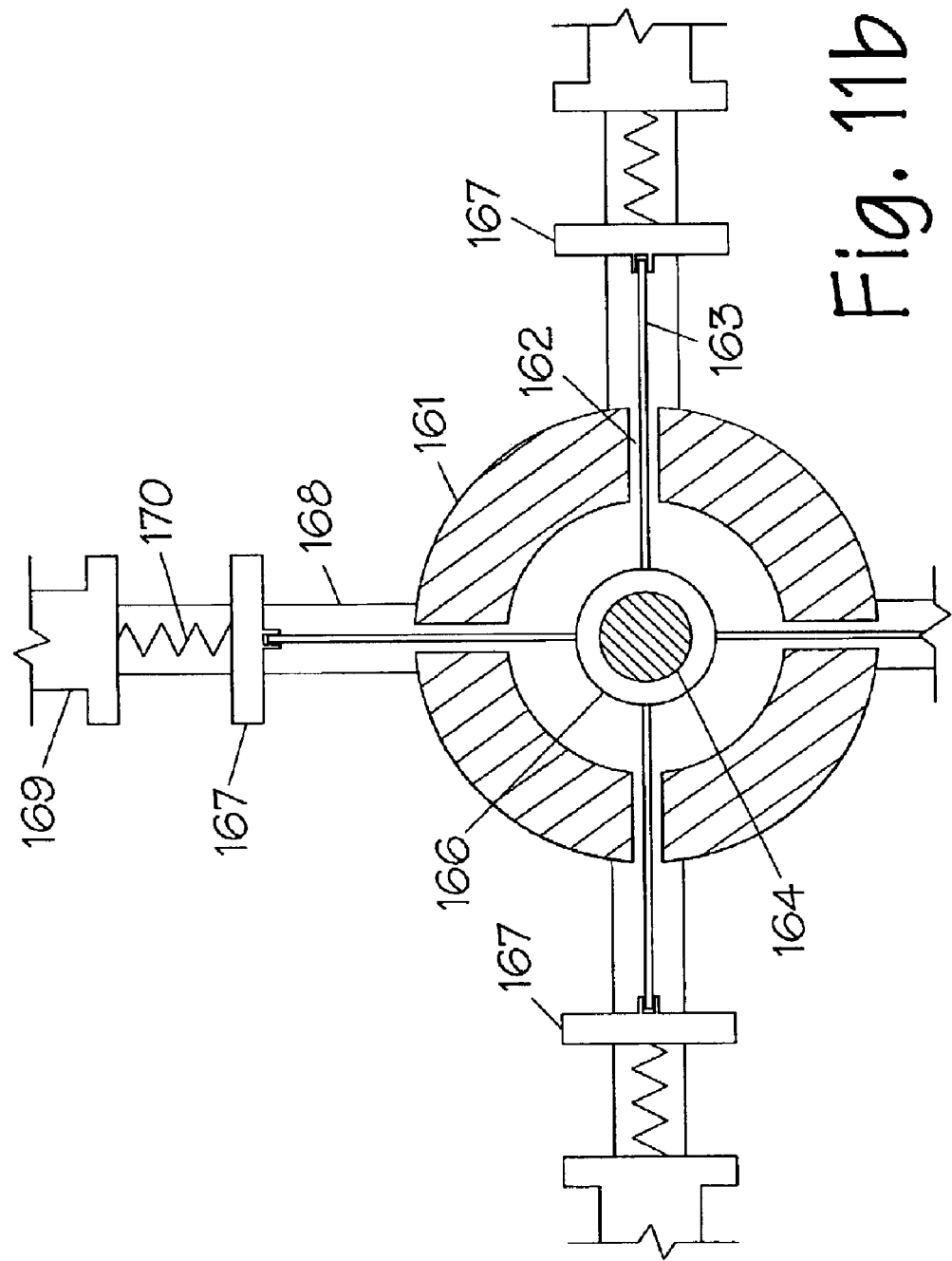

CONTINUOUSLY VARIABLE DIAMETER DRIVE WHEEL AND CONTINUOUSLY VARIABLE RATIO TRANSMISSION MADE THEREWITH

BACKGROUND OF INVENTION

This invention relates to a drive wheel the diameter of which can be continuously changed as it pulls a chain. It also relates to a transmission employing that drive wheel, where the ratio of output rpm to input rpm can change continuously.

Most engines operate at maximum efficiency at a particular rotational speed (rpm, revolutions per minute). At slower or faster speeds, they are less efficient and suffer excessive heat or wear. For that reason, it is desirable to have an engine operate at its peak efficiency rpm and use a transmission to obtain the desired rpm.

In a typical transmission, the engine drives a number of gears of different diameters and the output power is taken off the engine by using different combinations of those gears. Alternatively, sprocket wheels connected by a chain can be used instead of gears. Thus, to change the output to input rpm ratio it is necessary to disengage a gear and engage a different gear or shift a chain from a sprocket wheel of one diameter to a sprocket wheel of a different diameter.

That type of transmission has a number of deficiencies. First, during the time required to shift gears, no power is being drawn from the engine. This power gap is responsible for the forward-backward jerks that passengers in cars and trucks feel when the gears are shifted.

Second, the ratio of input rpm to output rpm must be a rational number (i.e., a number that can be expressed as the ratio of two integers). This ratio is the number of teeth on the input gear or sprocket wheel divided by the number of teeth on the output gear or sprocket wheel, and that ratio is necessarily a rational number as an integer number of evenly-spaced teeth must be used. If the desired ratio is irrational, such as $\sqrt{2}$, for example, it cannot be obtained using gears or sprocket wheels.

Third, only certain a limited number of ratios can be selected. In a car, there may be only 3 or 4 possible ratios. This means that if the ratio of peak efficiency is not one of the possible ratios, say it is 1.616, for example, the engine never operates at peak efficiency.

SUMMARY OF INVENTION

In the transmission of this invention, a chain is used to connect a variable-diameter drive sprocket wheel to another sprocket wheel and the ratio of output rpm to input rpm can be an infinite number of ratios, including even ratios that are irrational numbers, such as $\sqrt{2}$ (1.414 . . . ) or $\pi$ (3.14159 . . . ), ratios that are unobtainable by a conventional transmission. The engine power is used continuously, even when the ratio is being changed, and there is no "power gap" during which power is not supplied to the sprocket wheel. It follows that the ratio of peak engine efficiency can be selected, even if that ratio is not a rational number. Indeed, if that optimal ratio changes as the engine warms up, ages, or with the load, the output/input transmission ratio can be changed to track it.

BRIEF DESCRIPTION OF DRAWINGS

FIG. 2b is a side view through IIB—IIB in FIG. 2a.

FIG. 3b is a side view through IIIB—IIIB in FIG. 3a.

FIG. 4b is a side view through IVB—IVB in FIG. 4a.

FIG. 8b is an end view through VIIIB—VIIIB in FIG. 8a.

FIG. 8c is a plan view through VIIIC—VIIIC in FIG. 8a.

FIG. 9a is a partially cut-away side view of a certain presently preferred embodiment of an drive wheel according to this invention, where the modules are joined together as part of a cone.

FIG. 9c is a side view of a chain suitable for use with the drive wheel shown in FIGS. 9a and 9b.

FIG. 11b is an end view through XIB—XIB in FIG. 11a.

DETAILED DESCRIPTION

Figure 1:
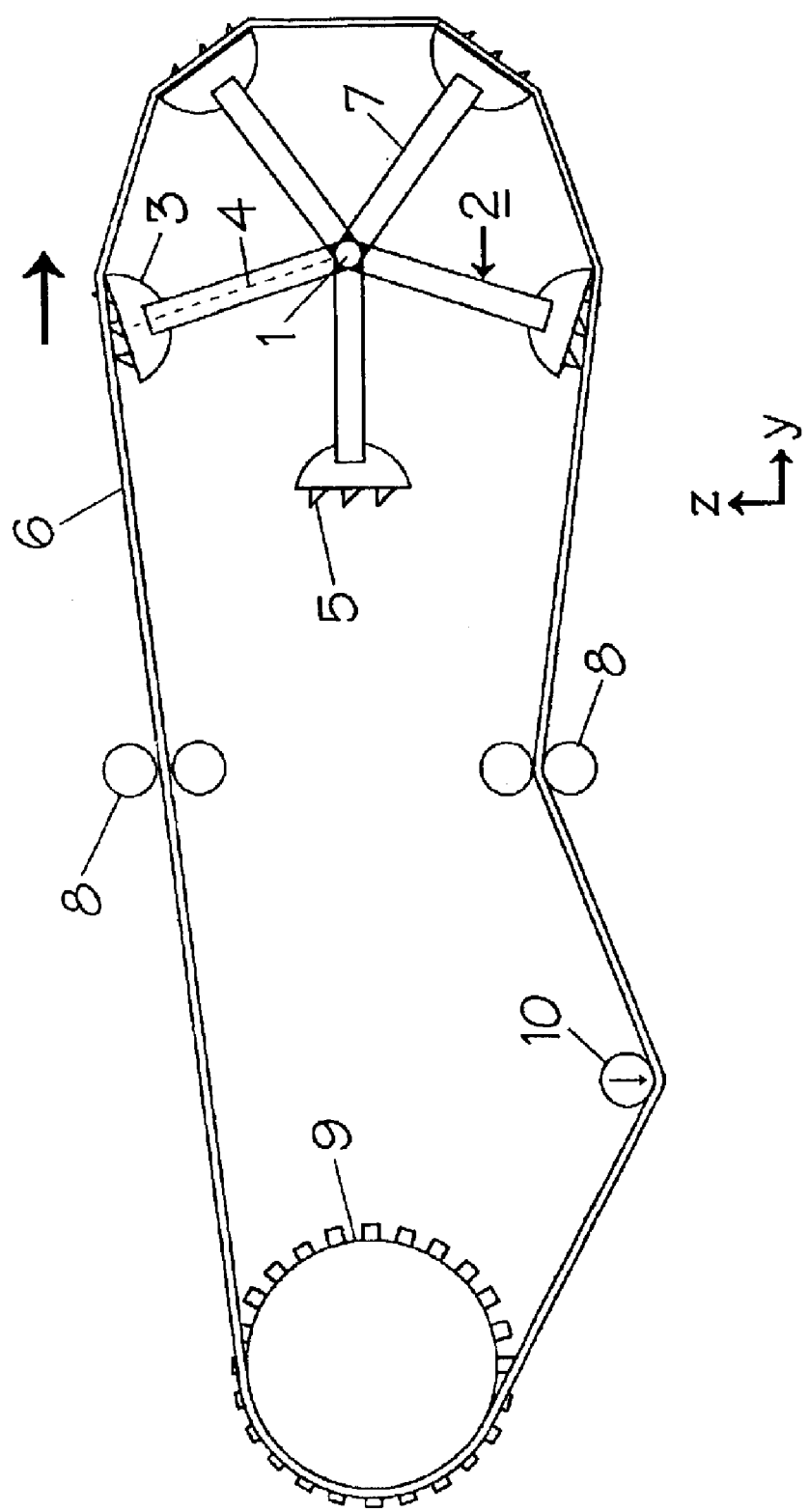
FIG. 1 is a side view illustrating a transmission employing a drive wheel according to this invention.

In FIG. 1, an engine, motor, turbine, paddle wheel, or other source of torque (not shown) turns drive shaft 1 in a clockwise direction. To shaft 1 is fixed variable-diameter drive wheel 2. Wheel 2 has five evenly-spaced modules 3, each on a radial axis 4 that extends from shaft 1. Each module 3 supports three teeth 5 that engage chain 6, which is typically composed of rollers rotatably connected to links. Each module 3 is connected to an extender 7, which is fixed to shaft 1. Extenders 7 change the distance between modules 3 and drive shaft 1 as drive shaft 1 is rotating. Modules 3 not only connect the chain-engaging means (e.g., teeth 5) to an extender but, as will be hereinafter explained, also permit the chain-engaging means to move so that it falls in between the rollers of the chain. Teeth 5 of the five modules 3 sequentially engage chain 6 as shaft 1 pulls chain 6 around wheel 2. Two pairs of guide wheels 8 position chain 6 as it engages and disengages teeth 5. If desired, the pairs of guide wheels 8 can be moved up and down in a z-axis direction to maintain a constant angle between the points of engagement and disengagement of chain 6 and wheel 2 as the diameter of wheel 2 changes. Chain 6 passes over sprocket gear 9, which rotates faster or slower according to whether the diameter of drive wheel 2 increases or decreases, respectively. Tension wheel 10, forced downward by a weight, spring, or other means, takes up the slack in chain 6 and keeps chain 6 taut as the diameter of drive wheel 2 changes. Alternatively, two tension wheels, spring biased to rotate about a common center, such as on a derailleur of a bicycle, or another means of keeping the chain taut, could be used.

Module Locks

If the chain takes a straight line shortcut between modules as shown in FIG. 1, the variable diameter drive wheel will have a diameter (an effective diameter), which will be less than twice the distance from the point that a module supports the chain to the center of the drive shaft. The effective diameter can be calculated by multiplying the diameter of the sprocket wheel by the transmission ratio (the sprocket wheel rpm divided by the drive wheel rpm); multiplying the effective diameter of the drive wheel by n gives its effective circumference. While the circumference of the sprocket wheel will be evenly divisible by an integer number of chain links (unless, of course, the sprocket wheel is also a drive wheel according to-this invention), the effective circumference of the drive wheel need not be evenly divisible by an integer number of chain links. Since a non-integer (e.g., 20¾) or an irrational number (e.g., 10 π) of links can be pulled around the drive wheel in each rotation, the transmission ratio, which is equal to the circumference of the sprocket wheel divided by the effective circumference of the drive wheel, can also be an irrational number.

When the effective circumference of the drive wheel is not evenly divisible by an integer number of chain links, the distance between the teeth on an engaged module and the teeth on the next module to be engaged will not be evenly divisible by an integer number of chain links. If the distance between one module and the next is not evenly divisible by an integer number of chain links, then before the teeth can engage (i.e., pull) the chain the module must change that distance by moving in a circumferential direction (i.e., a direction that is along a circumference of a circle centered at the center of the drive wheel or that is tangent thereto, denoted as "c" in the drawings) until it is at a position where the teeth can fall between the rollers of the chain. After a module has moved so that the rollers of the chain have slipped in between the teeth and the chain is engaged, that module is locked in that position so that the module contributes to pulling the chain and does not slip when the adjacent modules no longer engage the chain. When the chain is not engaged, the module is unlocked so that the module is free to return to its initial position.

Figure 2A:
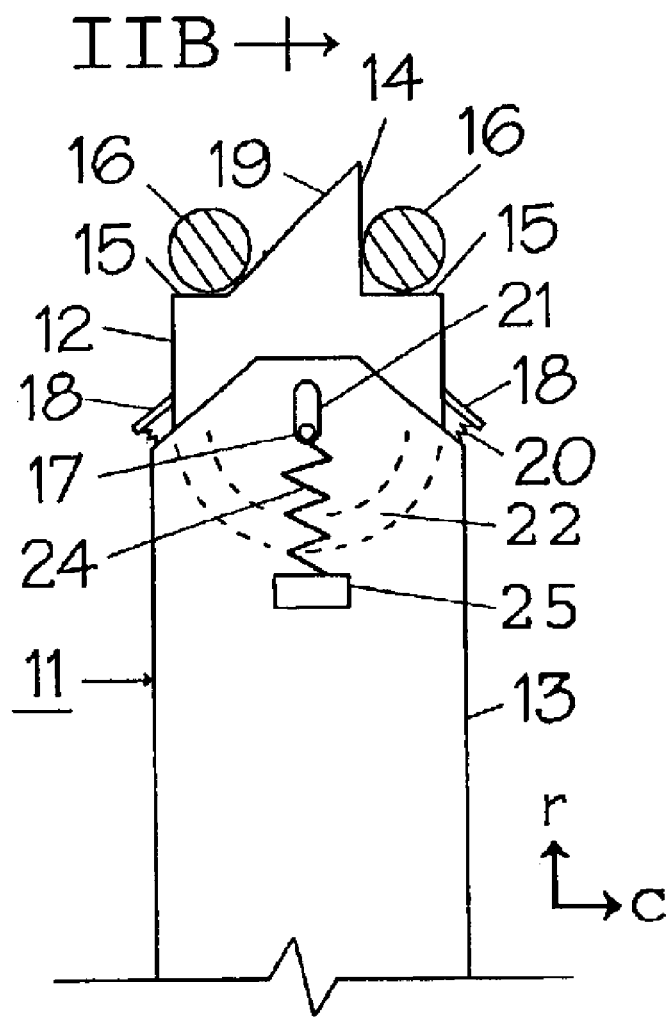
FIG. 2a is an end view of a certain presently preferred embodiment of a module according to this invention that has a rotating end portion and a wedge-type lock.
Figure 2B:
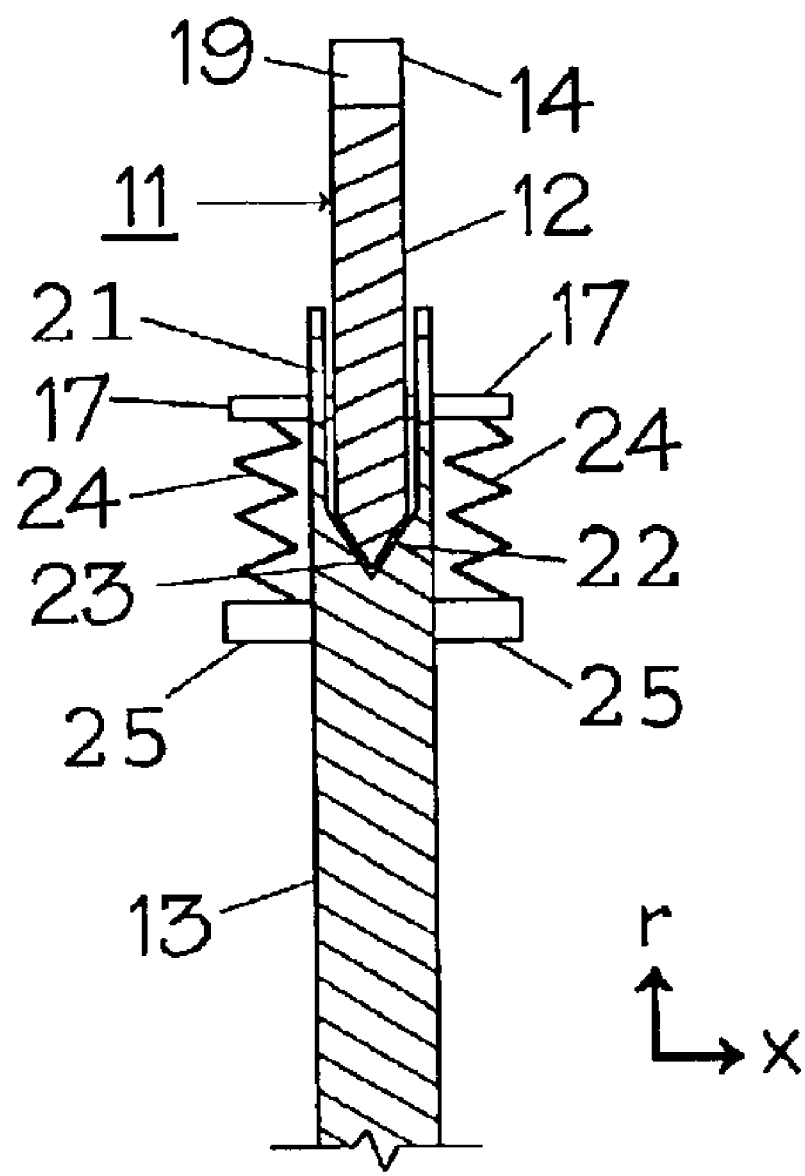

FIGS. 2a and 2b illustrate a wedge-type lock on a module. Module 11 has an end portion 12 that is rotatably mounted on shaft portion 13. End portion 12 is provided with a tooth 14 for engaging a chain. On each side of tooth 14 is a shelf 15 to support one of the rollers 16 of a chain. End portion 12 can rotate about pin 17, which is fixed to end portion 12. Stops 18 limit the amount of rotation in either direction. End portion 12 is preferably permitted to rotate only enough so that rollers 16 can contact shelves 15. Should tooth 14 not be positioned exactly in between rollers 16, which will usually be the case, the axially-directed force of the chain will cause end portion 12 to rotate until rollers 16 contact shelves 15. Tooth 14 has a sloping edge 19 to facilitate the rotation of end portion 12 in a clockwise direction, but counterclockwise rotation is also possible. If the trailing half of a roller contacts the top of a tooth, rotation could be counterclockwise by up to about the radius of the roller, and if the leading half of a roller contacts the top of a tooth or edge 19, the rotation could be clockwise by up to about the distance between rollers less the radius of a roller. Springs 20 somewhat center the tooth so that it can move by those two distances. To prevent slipping of the chain as modules disengage, the rollers preferably fit snugly against the teeth. The shelves preferably lie on a straight line so that the chain is straight when it is engaged. If the rollers are snug against the teeth and the shelves are not on a line (e.g., they lie on an arc of a circle), the distance between two rollers could be less than or greater than the distance between the teeth when the diameter of the drive wheel decreases or increases, possibly causing problems with the chain.

Shaft portion 13 is provided with a slot 21 in which pin 17 can move in a radial direction (denoted as r in the drawings). End portion 12 has a wedge 22 which has the circumference of a circle with its center at pin 17. A V-shaped groove 23 in shaft portion 13 has the same curvature and V-shape so the surface of groove 23 contacts the surface of wedge 22 when end portion 12 is forced axially (i.e., in an inward radial direction) towards shaft portion 13. The surface of wedge 22 and the surface of groove 23 can be roughened so that when wedge 22 is forced into groove 23 end portion 12 can no longer rotate about pin 17. Wedge 22 can also be made of a material such as hard rubber to prevent slippage. Springs 24 are attached to pin 17 and to steps 25 that extend from shaft portion 13. Springs 24 force pin 17 radially away from shaft portion 13. In operation, when tooth 14 does not engage a chain, springs 24 force pin 17 away from shaft portion 13 so that end portion 12 can rotate. When roller 16 of a chain presses against tooth 14, end portion 12 rotates until roller 16 contacts shelf 15, then roller 16 forces end portion 12 towards shaft portion 13 until wedge 22 contacts groove 23, locking end portion 12 and compressing springs 24.

Figure 3A:
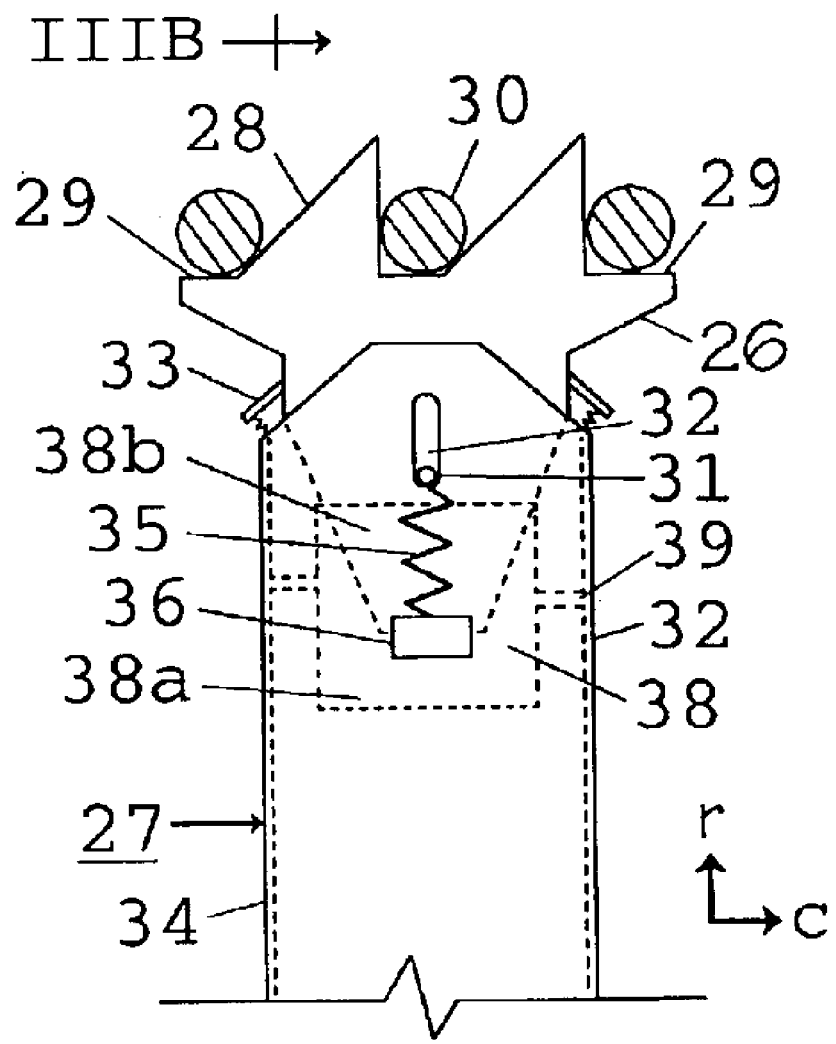
FIG. 3a is an end view of a certain presently preferred embodiment of a module according to this invention that has a rotating end portion and a clasp-type lock.
Figure 3B:
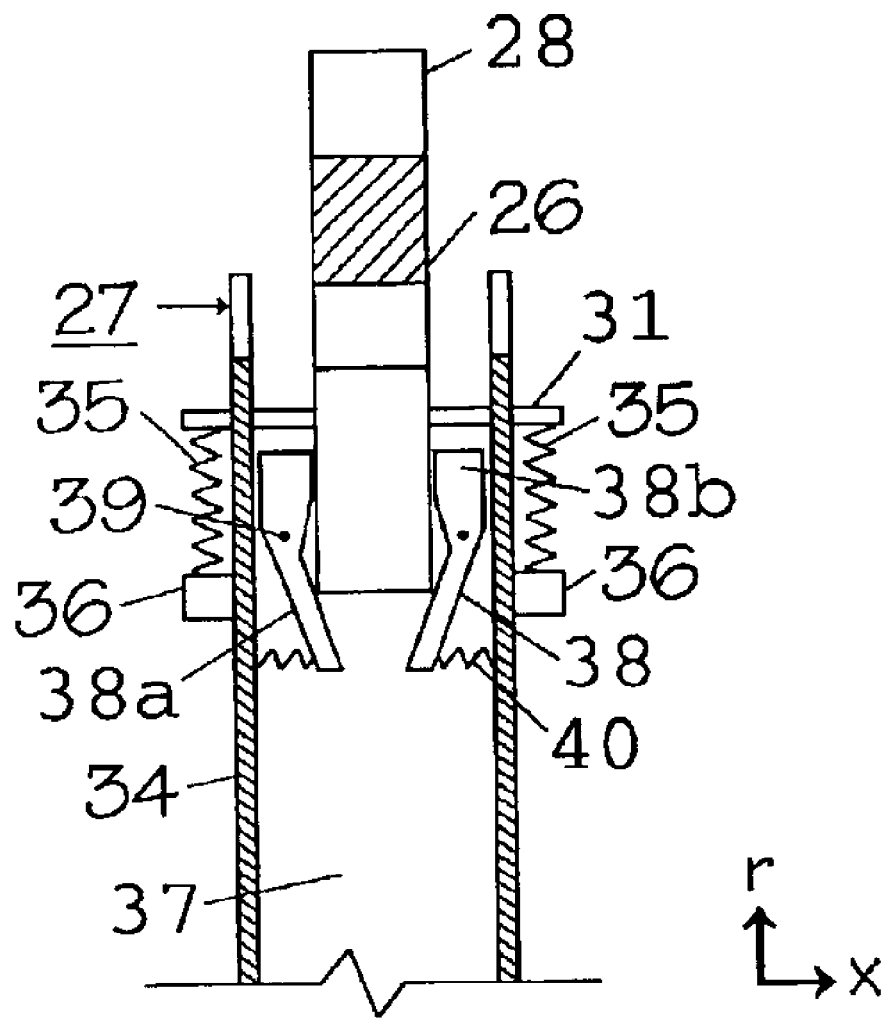

FIGS. 3a and 3b illustrate a clasping-type lock on a module. End portion 26 of module 27 has two teeth 28, and shelves 29 for supporting rollers 30 of the chain. As in FIGS. 2a and 2b, end portion 26 can rotate about pin 31 in slot 32 to the extent of stops 33. Pin 31 is biased away from shaft portion 34 by springs 35 attached to steps 36. Referring particularly to FIG. 3b, shaft portion 34 has chamber 37 in which are mounted two levers 38 that pivot about pins 39. Each lever 38 has an action arm 38a and a clasping arm 38b. Springs 40 bias levers 38 to separate clasping arms 38b. In operation, when teeth 28 do not engage a chain, end portion 26 is forced away from shaft portion 34 by springs 35. But when teeth 28 engage a chain, end portion 26 is forced towards shaft portion 34, forcing action arms 38a apart and clasping arms 38b together so that clasping arms 38b grip end portion 26, thereby preventing it from rotating about pin 31.

Figure 4A:
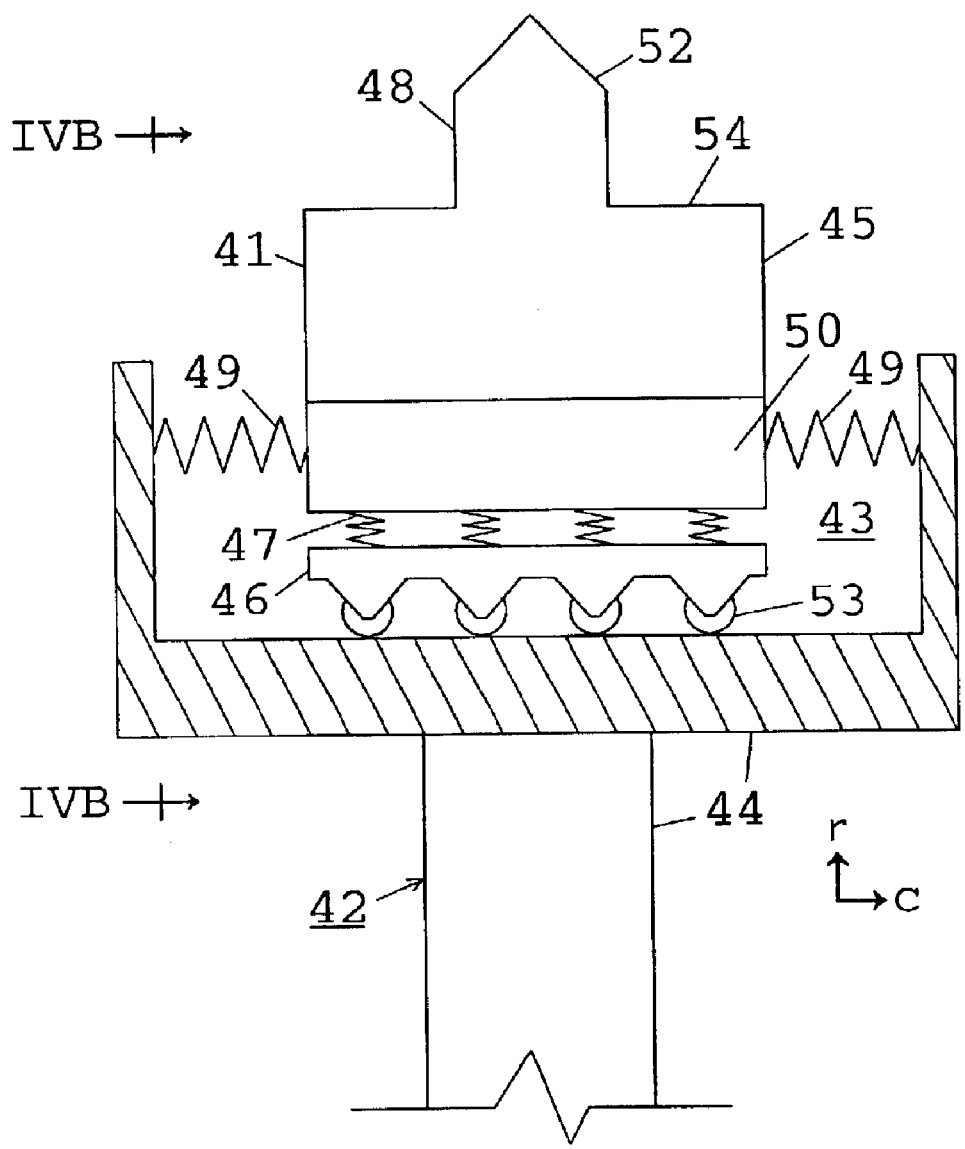
FIG. 4a is a partially cut-away end view of a certain presently preferred embodiment of a module according to this invention that has a rolling end portion and a wedge-type lock.
Figure 4B:
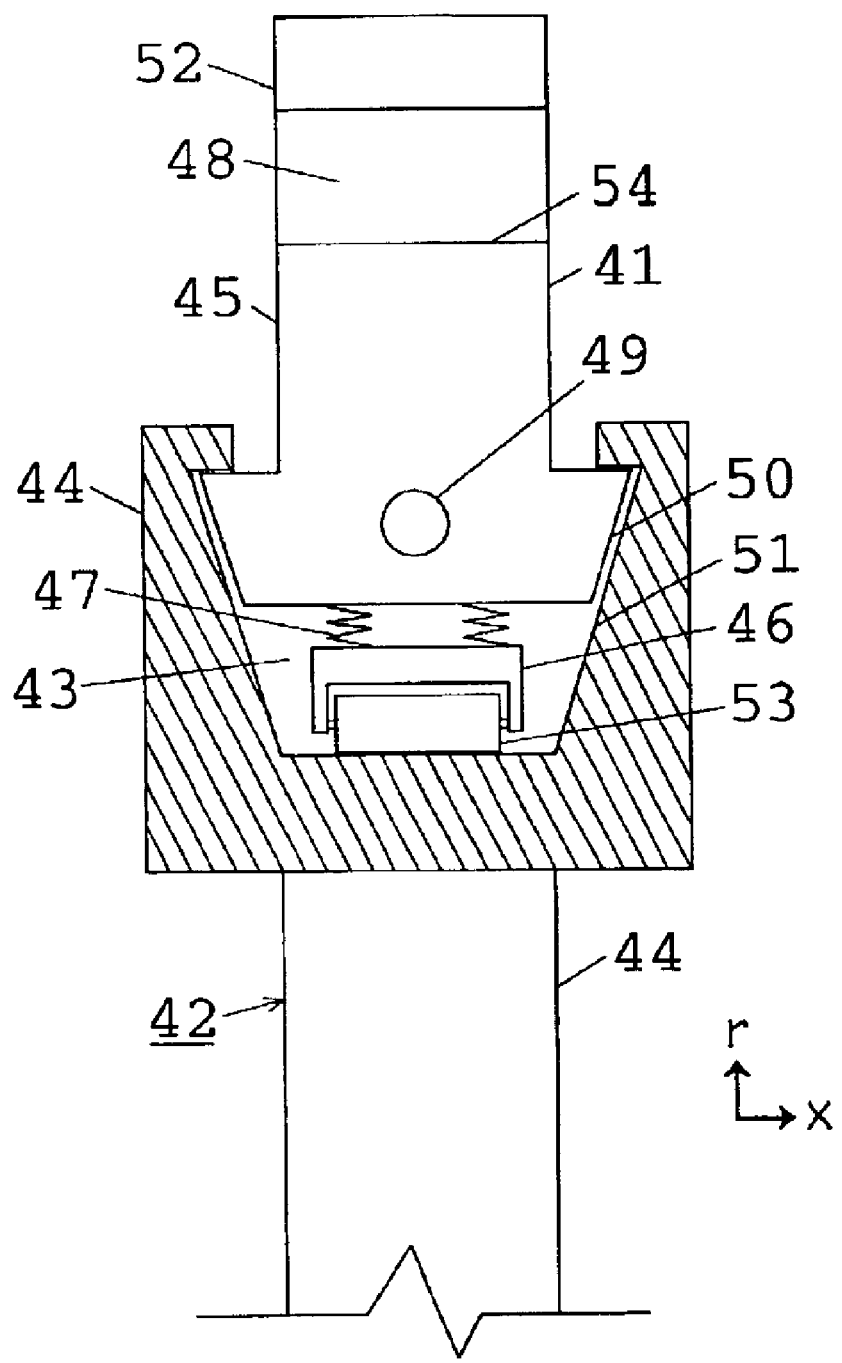

FIGS. 4a and 4b illustrate a module where the end portion is a car that rolls along the floor of a chamber in the shaft portion. End portion 41 of module 42 is inside chamber 43 of shaft portion 44. In chamber 43 is a car 45 mounted on bed 46 by means of springs 47. Car 45 holds tooth 48 and is somewhat centered (as hereinabove described for FIGS. 2a and 2b) by springs 49. Sides 50 of car 45 are angled at the same angle as sides 51 of chamber 43. When the roller of a chain presses against the sloping portion 52 of tooth 48, it forces car 45 to move in a circumferential direction on rollers 53 until the roller of the chain presses against shelf 54. When the chain roller presses against shelf 54 it pushes car 45 in an axial direction towards bed 46 until sides 50 of car 45 contact sides 51 of chamber 44, locking car 45 and preventing it from moving as tooth 48 pulls the chain. When the drive wheel has turned so that the chain is no longer engaged by tooth 48, springs 47 push car 45 away from bed 46 50 that car 45 can move circumferentially and return to its radial axis.

Figure 5:
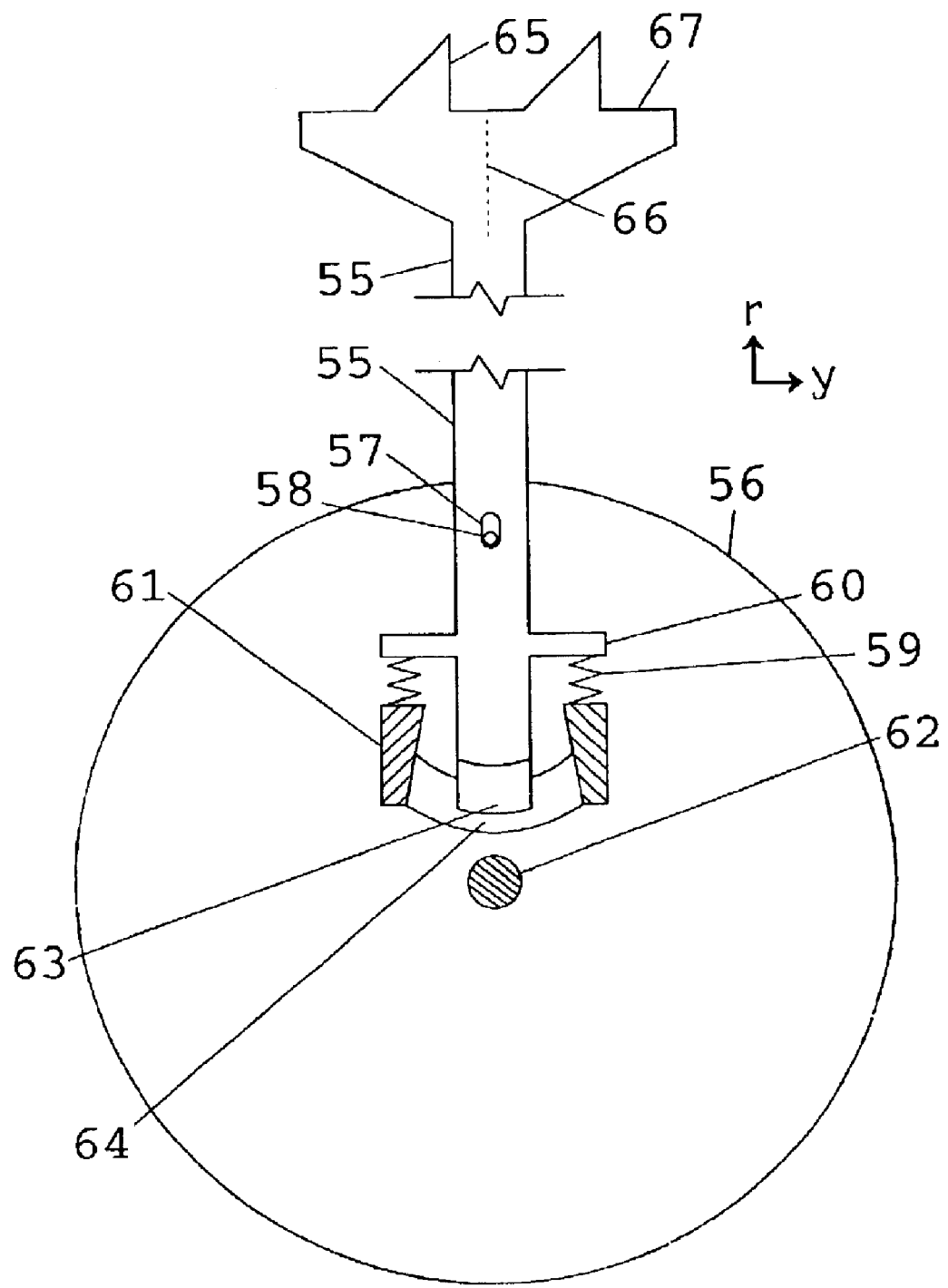
FIG. 5 is an end view partially in section of a certain presently preferred embodiment of a module having a wedge-type lock, where the extender is in between parts of the shaft portion of the module.

In FIG. 5, the extender (not shown) is between the top and bottom of the shaft portion of a module (only one shown). Shaft portion 55 is sandwiched between disks 56 (only one shown). There is a slot 57 in shaft portion 55 though which passes pin 58, which is fixed to discs 56. Springs 59, between steps 60 and stops 61, bias shaft portion 55 away from drive shaft 62 and center shaft portion 55 when a chain is not engaged. The base 63 of shaft portion 55 is wedge-shaped and sits in a similarly wedge-shaped canyon 64 between the two disks 56. When a roller of a chain contacts a tooth 65, it forces tooth 65 and base 63 to rotate away from radial axis 66. Then, when the roller presses against shelf 67, it moves base 63 against canyon 64, preventing further rotation of tooth 65 and base 63. When the chain is no longer engaged, springs 59 force shaft portion 55 away from drive shaft 62 and restore shaft portion 55 to its radial axis.

Extenders

An extender provides an mechanism for changing the distance between the chain-engaging means on a module and the drive shaft as drive wheel is rotating. That distance (the radius of the drive wheel) can be changed by any amount, within the limits of the extender, including amounts that do not change the distance between the chain-engaging means on sequential modules by the distance between an integral number of chain links. Again, changing the distance between the chain-engaging means and the drive shaft is accomplished when the chain is not engaged. If the distance is changed when the chain is engaged, and the chain-engaging means on other modules also engage the chain, the chain may be forced off the chain-engaging means, or it may buckle or be broken.

The distance between the chain-engaging means and the drive shaft can be changed by an extender in one of two ways, either (1) the distance from the drive shaft to each module can be changed for each module, one at a time, when the chain-engaging means supported by a module does not engage a chain, or (2) energy can be stored in the extenders at any time then, when a module does not engage the chain, the energy stored in an extender can be released to move the module connected to it. FIGS. 6, 7, 8, 9, and 10 illustrate the first method and FIGS. 11, 12, 13, and 14 illustrate the second method. If the distance is changed for each module, one at a time (the first method), it can be done by a control that does not rotate with the drive shaft, as in FIGS. 6 to 9, or it can be done by a control that rotates with the drive shaft, as in FIG. 10.

Figure 6:
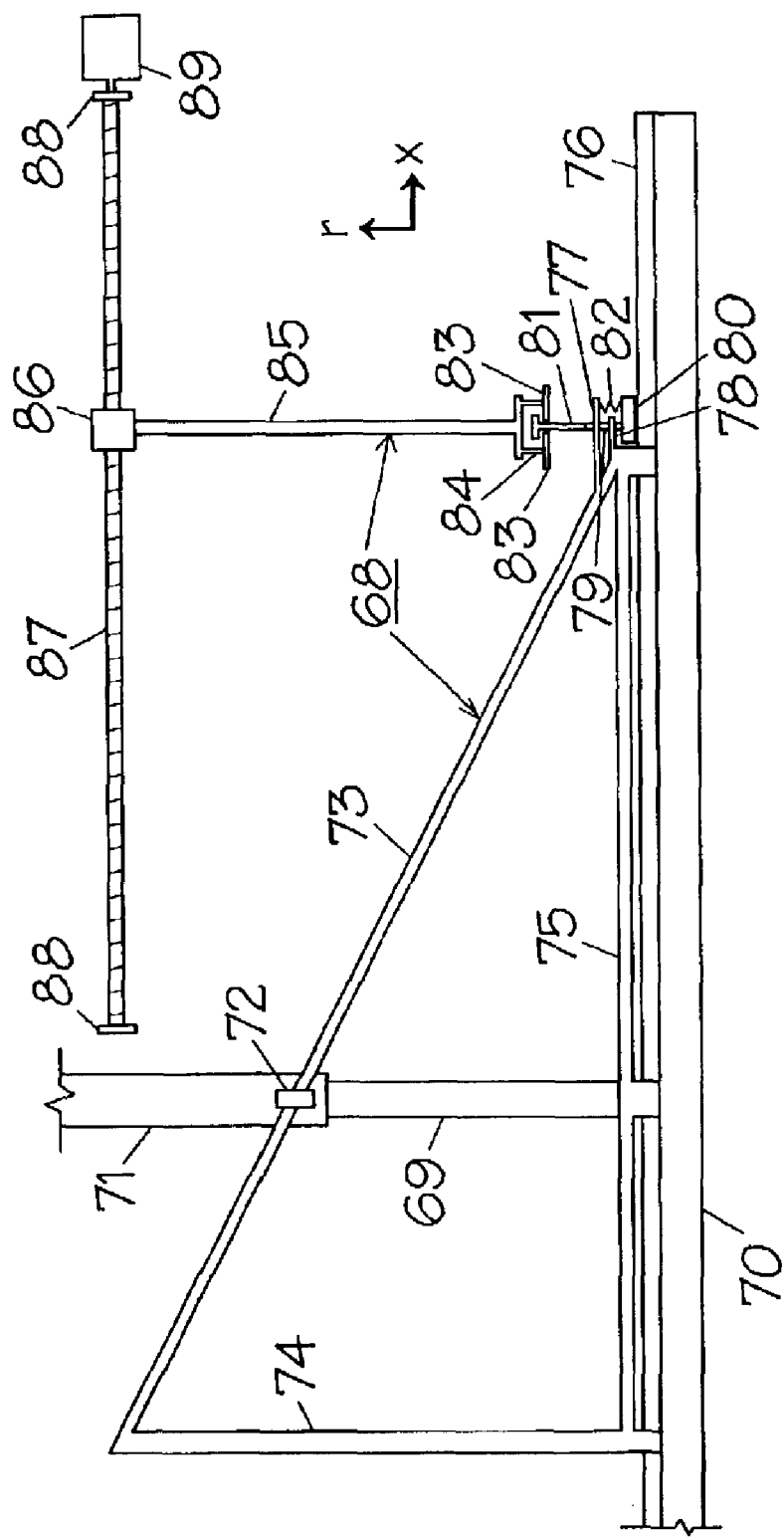
FIG. 6 is a side view of a certain presently preferred embodiment of an extender according to this invention.
Figure 10:
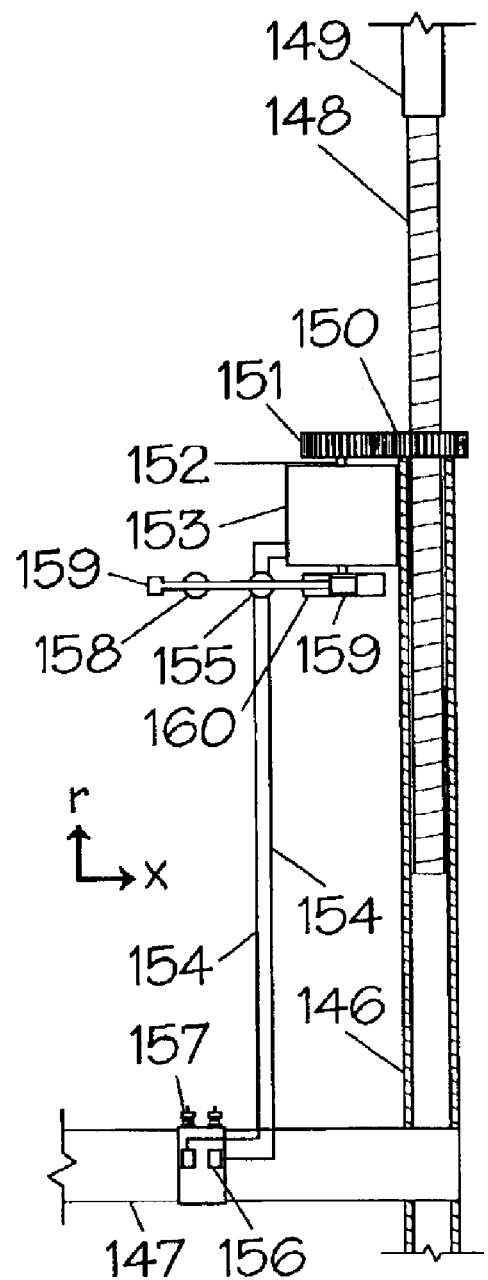
FIG. 10 is a partially cut-away view of another certain presently preferred embodiment of an extender according to this invention.

Referring to FIG. 6, extender 68 has post 69 fixed to drive shaft 70. Shaft portion 71 of a module rides over post 69. Shaft portion 71 has an eyelet 72 attached to it through which passes diagonal rod 73. Diagonal rod 73 is supported by radially-extending support 74 at one end and, at the other end, by one end of rod 75. Support 74 is also attached to the other end of rod 75. Rod 75 can slide in an x-axis direction along track 76, which is attached to drive shaft 70. At the juncture of rods 73 and 75 are extensions 77 and 78, each having an aperture through which passes rod 79. To one end of rod 79 is attached a stop 80 and to the other end is attached plate 81, which is made of a ferromagnetic material, such as iron or steel. A spring 82 biases rod 79 towards track 76 so that stop 80 is in contact with track 76. On either side of plate 81 are wheels 83 rotatably held in position by axles 84 which are attached to magnet 85. The other end of magnet 85 is attached to nut 86, which is treadedly engaged with screw 87. Screw 87 is held in position by supports 88 and can be rotated in either direction by motor 89. (As shown in FIG. 10, a wheel can be attached to the other end of the axle of motor 89 and that wheel can be clamped to prevent rotation of screw 87, except when such rotation is desired.) In operation, spring 82 presses stop 80 against track 76, thereby preventing rod 75 from sliding along track 76, locking the distance between drive shaft 70 and shaft portion 71 of the module. When plate 81 passes between wheels 83, magnet 85 pulls plate 81 away from shaft 70, raising stop 80, which permits rod 75 to slide along track 76. To change the distance between shaft 70 and the module, motor 89 is activated, moving nut 86, magnet 85 and wheels 83. As plate 81 passes between wheels 83, it contacts a wheel 83, which moves it in an x-axis direction, thereby increasing or decreasing the distance between a module and shaft 70. After plate 81 is no longer between wheels 83, spring 82 forces stop 80 against track 76, locking in the new distance. Each plate 81 extends in a circumferential direction between radii that extend from shaft 70. However, plates 81 should not extend so far in a circumferential direction that stop 80 is released when the teeth of the module engage the chain. In this embodiment, changes in the x-axis position of wheels 83 should not be made too rapidly, so that on each rotation of shaft 70 plate 81 strikes near the end of a wheel 83, not near its center. If shaft 70 is rotating at, say, 600 rpm, however, and plate 81 is moved only 1/16 inch on each rotation, wheel 83 will still be moved 5/8 inches per second, so this should not be a problem.

Figure 7:
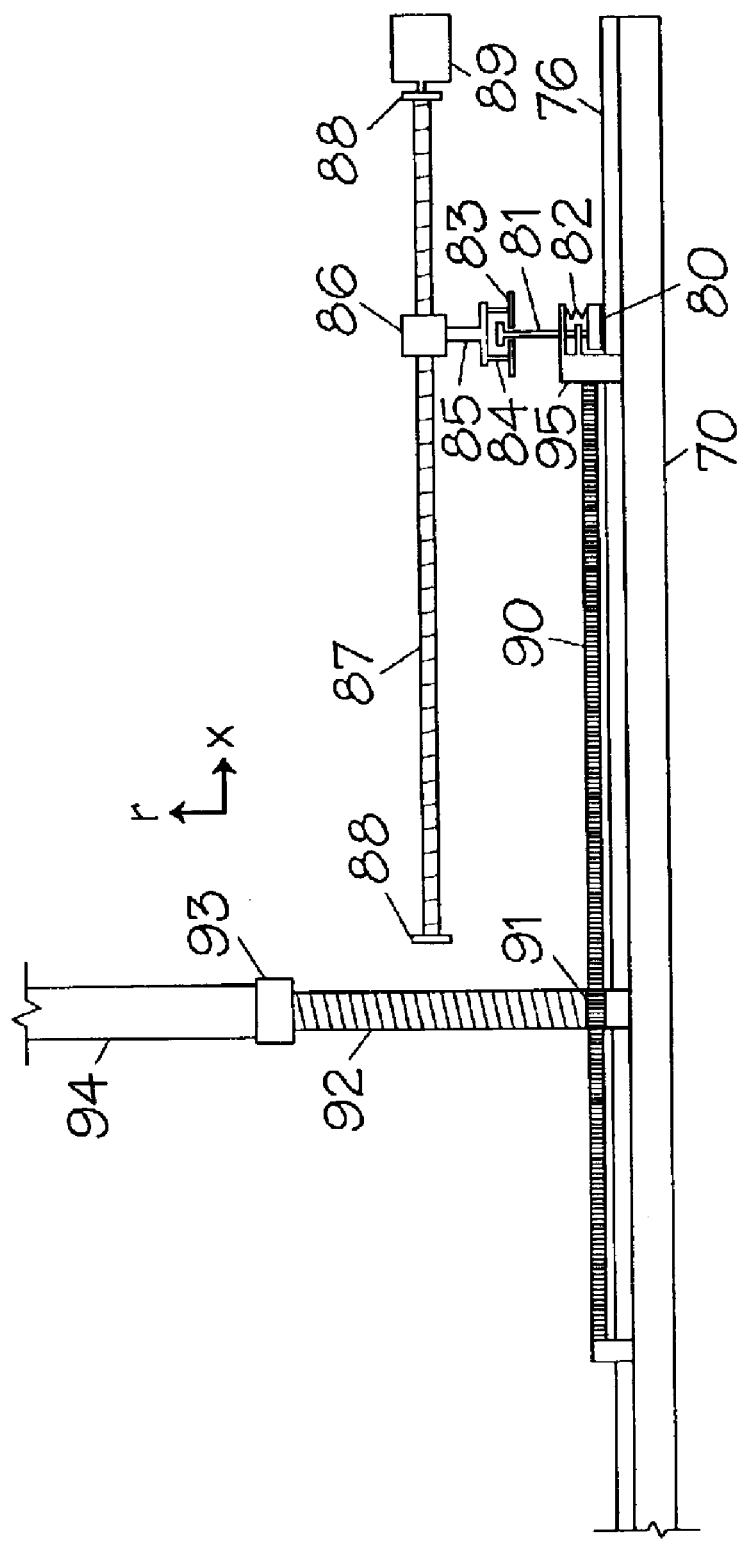
FIG. 7 is a side view showing a modification of the extender shown in FIG. 6.

FIG. 6 shows how an extender can convert movement in an x-axis direction into movement in a radial direction for each module as it is rotating. FIG. 7 shows how the extender of FIG. 6 can be modified to accomplish that purpose in a more compact manner. In FIG. 7, most of the extender is the same as in FIG. 6. However, rod 75 in FIG. 6 has been replaced by rod 90, which has teeth along one edge that engage the teeth of a gear 91, which is fixed to the bottom of a screw 92 and is rotatably attached to drive shaft 70. A nut 93 engages screw 92 and is fixed to shaft portion 94 of a module. The end 95 of rod 90 is slightly changed from FIG. 6, but the mechanism for moving rod 90 and locking its position is the same as in FIG. 6. Thus, when rod 90 is moved in an x-axis direction (as described for rod 75 in FIG. 6), it rotates screw 92 which causes shaft portion 94 to move towards or away from the drive shaft.

Figure 8A:
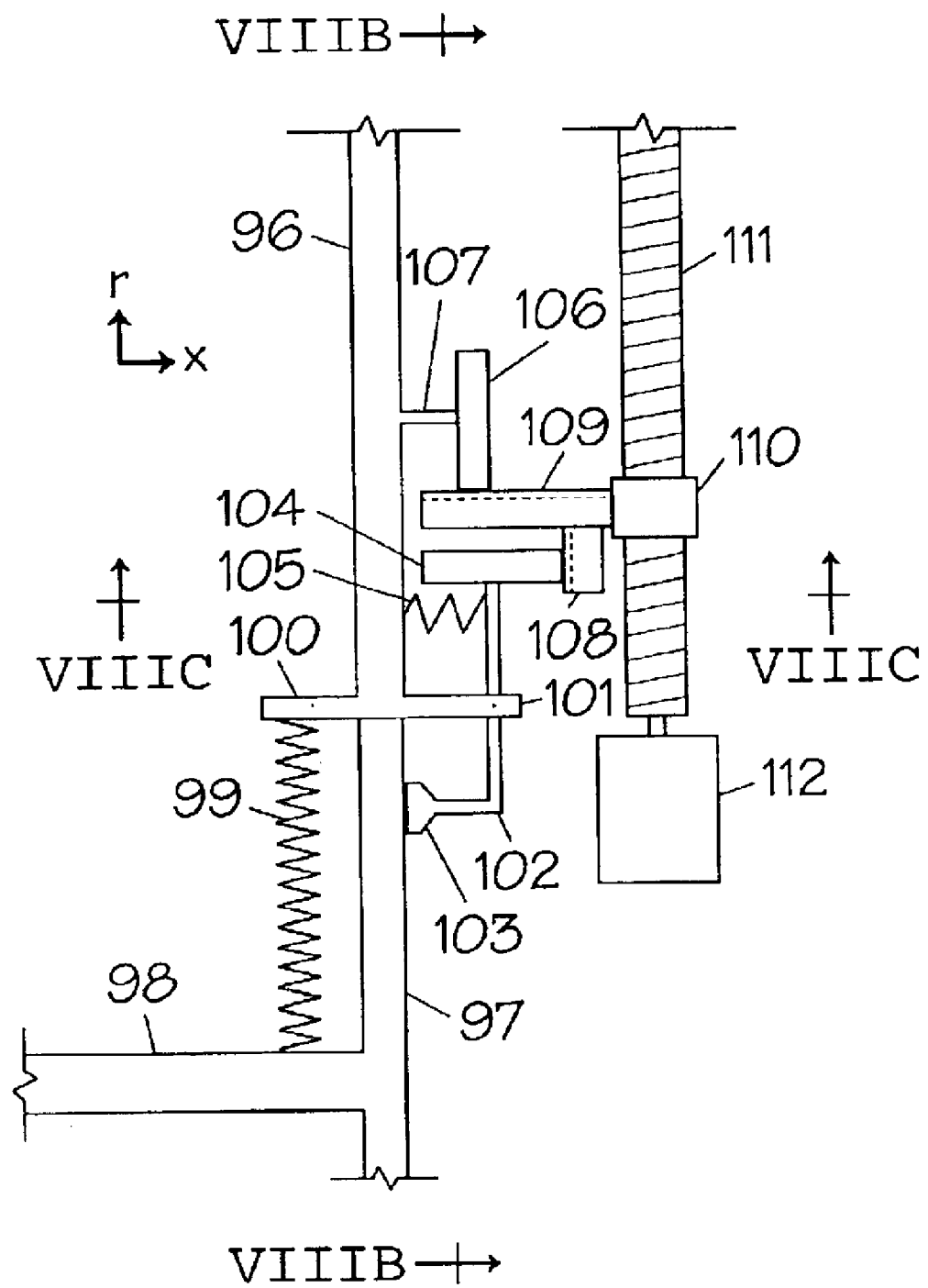
FIG. 8a is a side view of a certain presently preferred embodiment of another extender according to this invention.
Figure 8B:
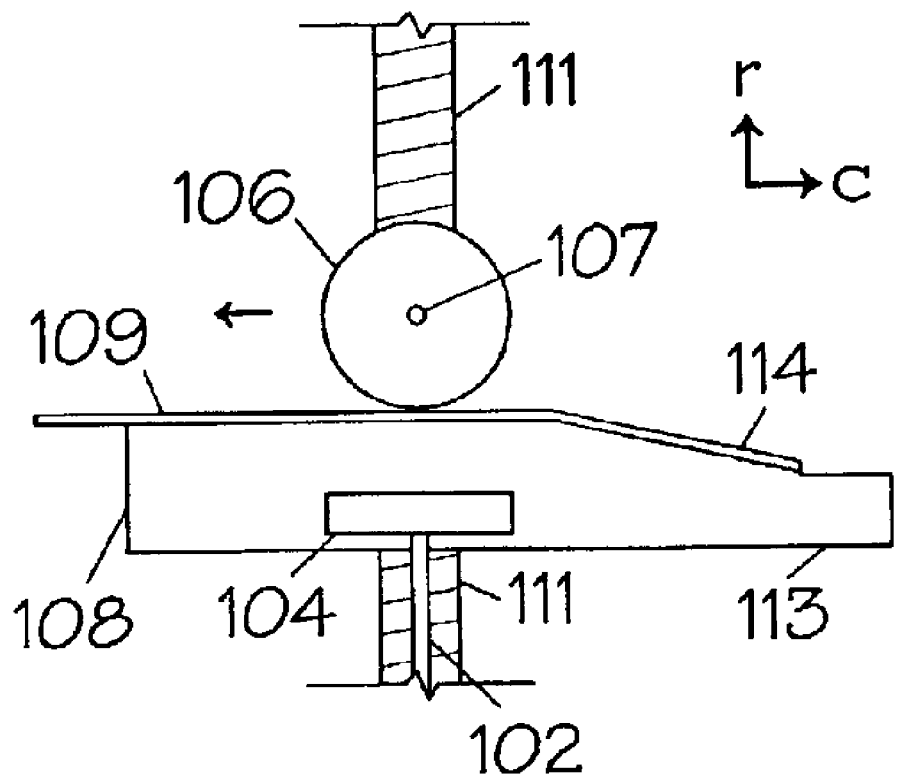
Figure 8C:
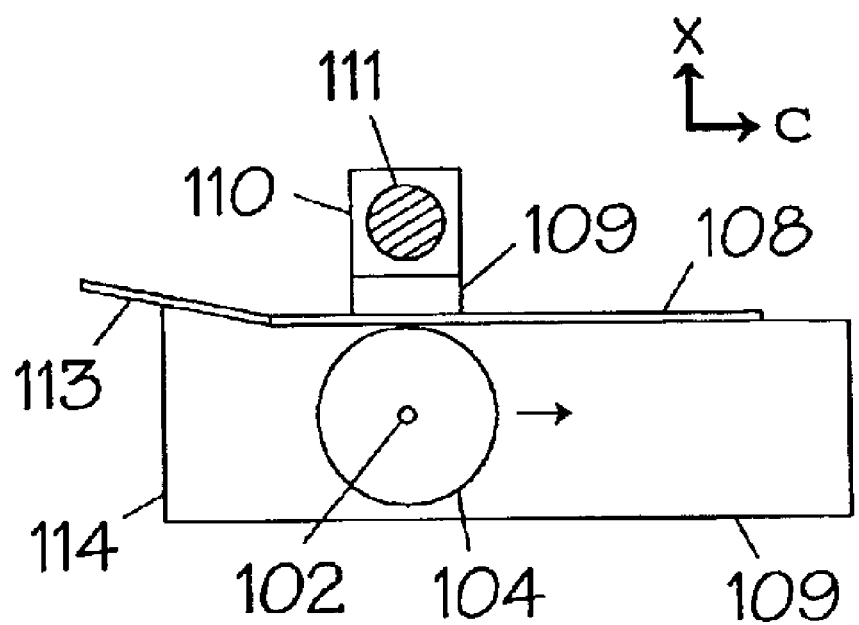

In FIG. 8a, shaft portion 96 of a module rides over post 97 which is fixed to drive shaft 98. Spring 99, fixed to drive shaft 98 and to step 100 of shaft portion 96, biases shaft portion 96 towards drive shaft 98. On a second step 101 is pivoted a lever 102, which has a stop 103 fixed to one end and a wheel 104 rotatably mounted on the other. A spring 105 biases wheel 104 away from shaft portion 96. Another wheel 106 is rotatably mounted on axle 107. As drive shaft 98 rotates, on each revolution wheel 104 rides over non-rotating plate 108, which pushes wheel 104 towards shaft portion 96, causing stop 103 to move away from rod 97, unlocking shaft portion 96 so that it can move in a radial direction. If wheel 106 is not in contact with plate 109, spring 99 pulls shaft portion 96 toward drive shaft 98 until wheel 106 contacts plate 109. Plates 108 and 109 are fixed to nut 110 which is threadedly engaged with screw 111. Motor 112 can turn screw 111 in either direction, moving nut 110 in a radial direction. Wheel 104 then moves off plate 108, causing stop 103 to again contact post 97, locking the new position of shaft portion 96. Alternatively, plate 109 can push wheel 106 and shaft portion 96 away from drive shaft 98 and that new position will be locked when wheel 104 moves off plate 108 and stop 103 contacts post 97. Plates 108 and 109 are made with ramps 113 and 114, respectively (see FIGS. 8b and 8c), and wheel 104 strikes plate 108 before wheel 106 strikes plate 109, so that stop 103 releases shaft portion 96 just before plate 109 engages wheel 197.

Figure 9B:
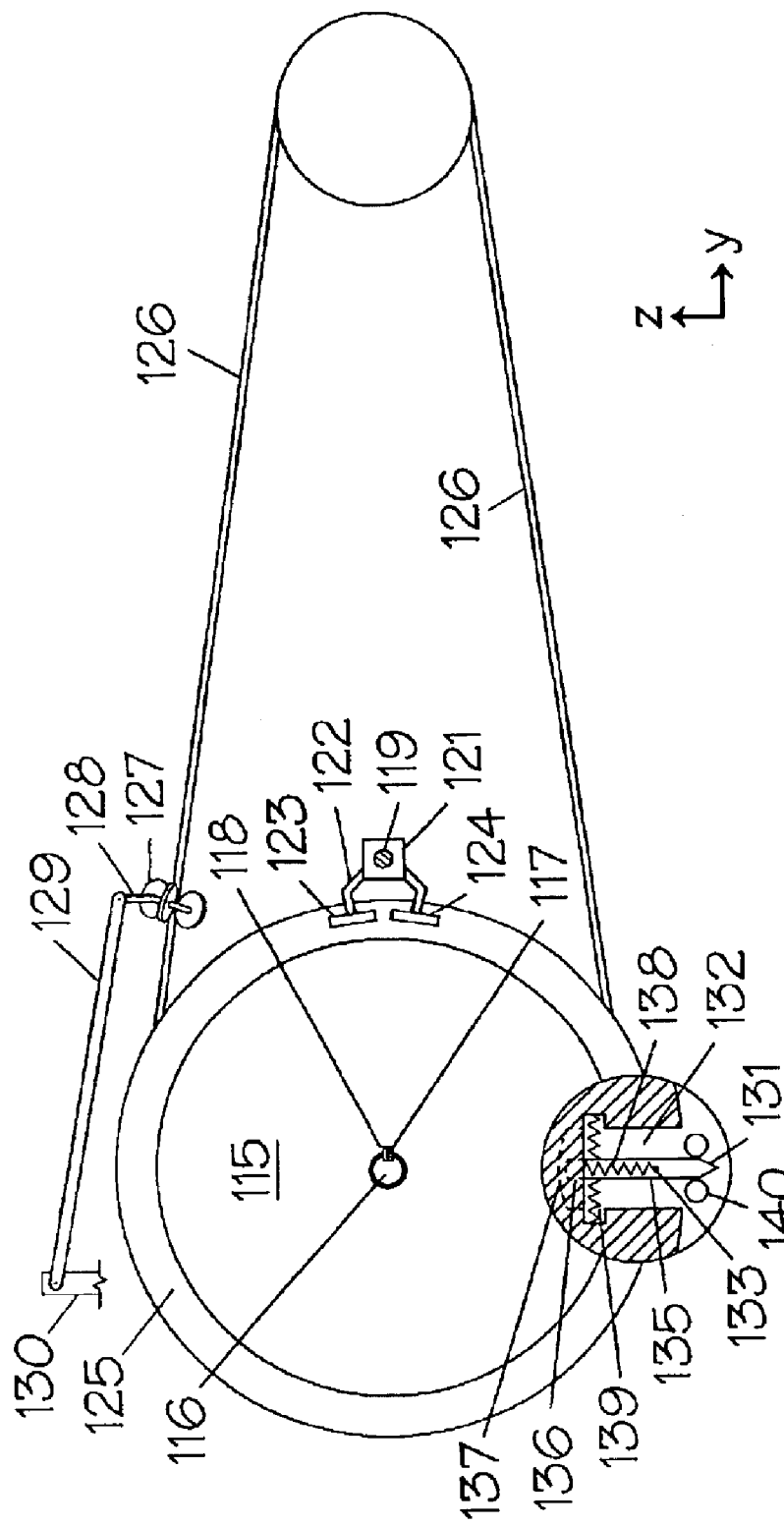
FIG. 9b is a partially cut-away end view of the drive wheel of FIG. 9a, with an enlargement window.

The drive wheel shown in FIGS. 9a and 9b is somewhat similar to the drive wheel shown in FIG. 6, except that blades are used to engage the chain instead of teeth, the modules that support the blades are joined together to form a cone, and the extender changes the distance between a blade and the drive shaft by moving the cone in an x-axis direction while the chain is held in a fixed x-axis position. The cone fills in the space between the modules, thereby reducing chain bouncing in radial directions due to the chain taking short cuts in between the modules. Referring to FIGS. 9a and 9b, cone 115 can slide along drive shaft 116, but rotates with drive shaft 116 due to spline 117, which engages keyways 118 in cone 115 and drive shaft 116. Screw 119 in the x-axis direction parallel to drive shaft 116 can be rotated in either direction by fixed motor 120. Nut 121 is treadedly engaged with screw 119. Carriage 122 is fixed to nut 121 and two wheels 123 and 124 are rotatably attached to carriage 122. Wheels 123 and 124 fit inside circumferential groove 125 in the large end of cone 115, with wheel 123 rolling over the surface of one side of groove 125 and wheel 124 rolling over the surface of the other side of groove 125. Thus, when motor 120 turns screw 119, cone 115 slides in an x-axis direction. (Motor 120 can be provided with a wheel on its shaft and clamps to grasp the wheel and prevent the shaft from turning, as shown in FIG. 10, if needed to keep the shaft of the motor from moving when the motor is not turned on.) Chain 126 is surrounded by four guide wheels 127 rotatably mounted on another carriage 128. Guide wheels 127 prevent chain 126 from moving in an x-axis direction. Carriage 128 is rotatably mounted on arm 129 which is in turn rotatably mounted on support 130. Thus, guide wheels 127 keep chain 126 in a y-z plane, but arm 129 permits chain 126 to move within that plane in a z-axis direction as cone 115 slides in an x-axis direction beneath it. Chain 126 is pulled around cone 115 by a number of blades 131. Referring to the cut-away portion in FIG. 9a and to the enlarged cut-away portion in FIG. 9b (which is looking along the surface of the cone, a direction indicated by the arrow labeled E in FIG. 9a), blade 131 is positioned in groove 132 in cone 115. Pins 133 (one at each end of blade 131) ride in slot 134 in cone 115. To blade 131 is fixed spike 135, which terminates in a wedge 136. Wedge 136 fits into similarly-shaped groove 137 in cone 115. Springs 138 bias blade 115 away from cone 115 and springs 139 keep blade 131 about in the center of groove 132. In operation, motor 120 rotates screw 119, moving cone 115 in an x-axis direction as it rotates. Guide wheels 127 cause the chain 126 to contact blade 131 at a different position, increasing or decreasing the distance between chain 126 and drive shaft 116. As the top of blade 131 contacts rollers 140 of chain 126, rollers 140 cause blade 131 to rotate on pins 133 until blade 131 fits in between rollers 140. Then the links of chain 126 contact blade 131 and push blade 131 in an axial direction (i.e., toward drive shaft 116) until wedge 136 contacts groove 137, thereby locking blade 131 so that it can no longer rotate.

Figure 9D:
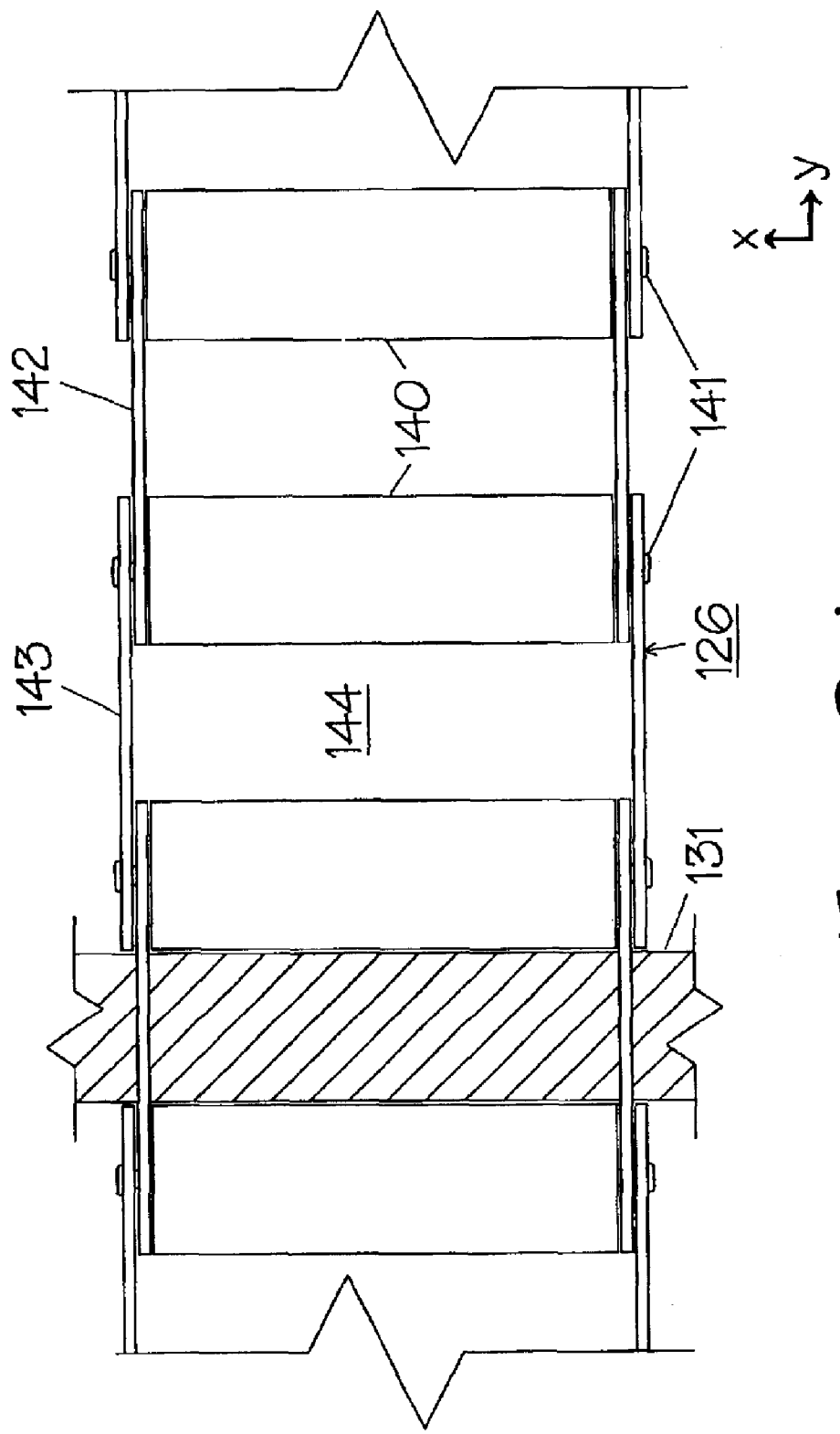
FIG. 9d is a plan view through IXD—IXD in FIG. 9c.

Referring to FIGS. 9c and 9d, chain 126 has rollers 140 held by pins 141 to inside links 142 and outside links 143. Unlike conventional chains, chain 126 has deep indentations 144 so that blades 131 can fit in between rollers 140. Also, links 142 and 143 have wings 145 that guide wheels 127 can easily contact. If chain 126 is engaged by a conventional sprocket gear, chain 126 will twist slightly between cone 115 and the conventional sprocket gear. Chain designs that do not require twisting can be made by mounting rollers 140 to links 142 and 143 at an angle that matches the angle of cone 115.

In FIG. 10, a post 146 for each module is fixed to drive shaft 147. Inside each post 146 is a screw 148, one end of which is rotatably attached to shaft portion 149 of a module. Nut 150 is treadedly engaged with screw 148 and has a circular toothed circumference, which engages gear 151 on shaft 152 of motor 153. Wires 154 connect motor 153 and solenoid 155 to contacts 156 which can receive direct current through non-rotating brushes 157. When no current flows through wires 154, solenoid 155 is inactivated and springs 158 cause clamps 159, joined at one end and having a gripping surface at the other end, to grip wheel 160 on shaft 152 of motor 153, preventing shaft 152 from turning. When current flows through wires 154, solenoid 155 is activated, creating an electromagnet that pushes clamps 158 (made of a ferromagnetic material, such as iron or steel) apart, releasing wheel 160, and permitting shaft 152 of motor 153 to turn. Shaft 152 of motor 153 can rotate clockwise or counterclockwise, depending on the direction in which the current flows through wires 154. Wires 154 obtain current from brushes 157 only when drive shaft 147 has turned so that the module does not engage the chain. Thus, shaft 152 of motor 153 can rotate only when the chain is not engaged. Otherwise, shaft 152 is locked, thereby locking screw 148 and preventing the distance between the module and drive shaft 147 from changing.

Figure 11A:
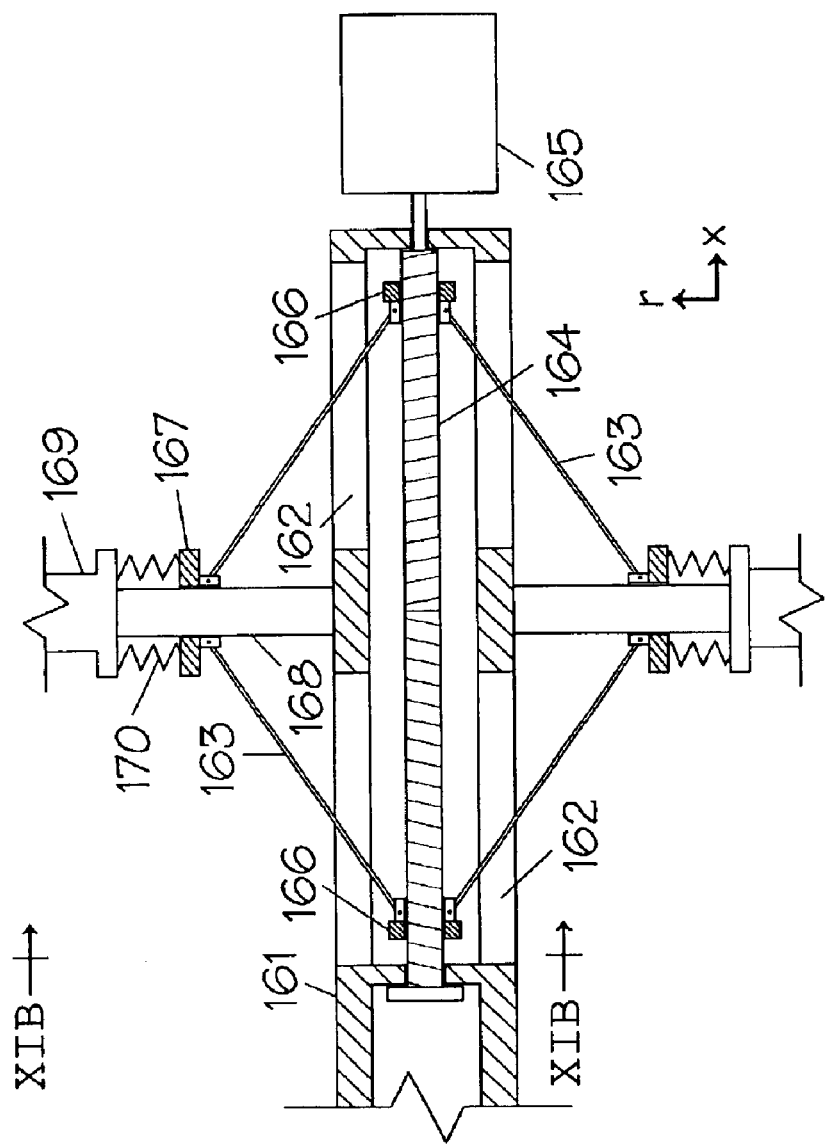
FIG. 11a is a partially cut-away side view of yet another certain presently preferred embodiment of an extender according to this invention.
Figure 15:
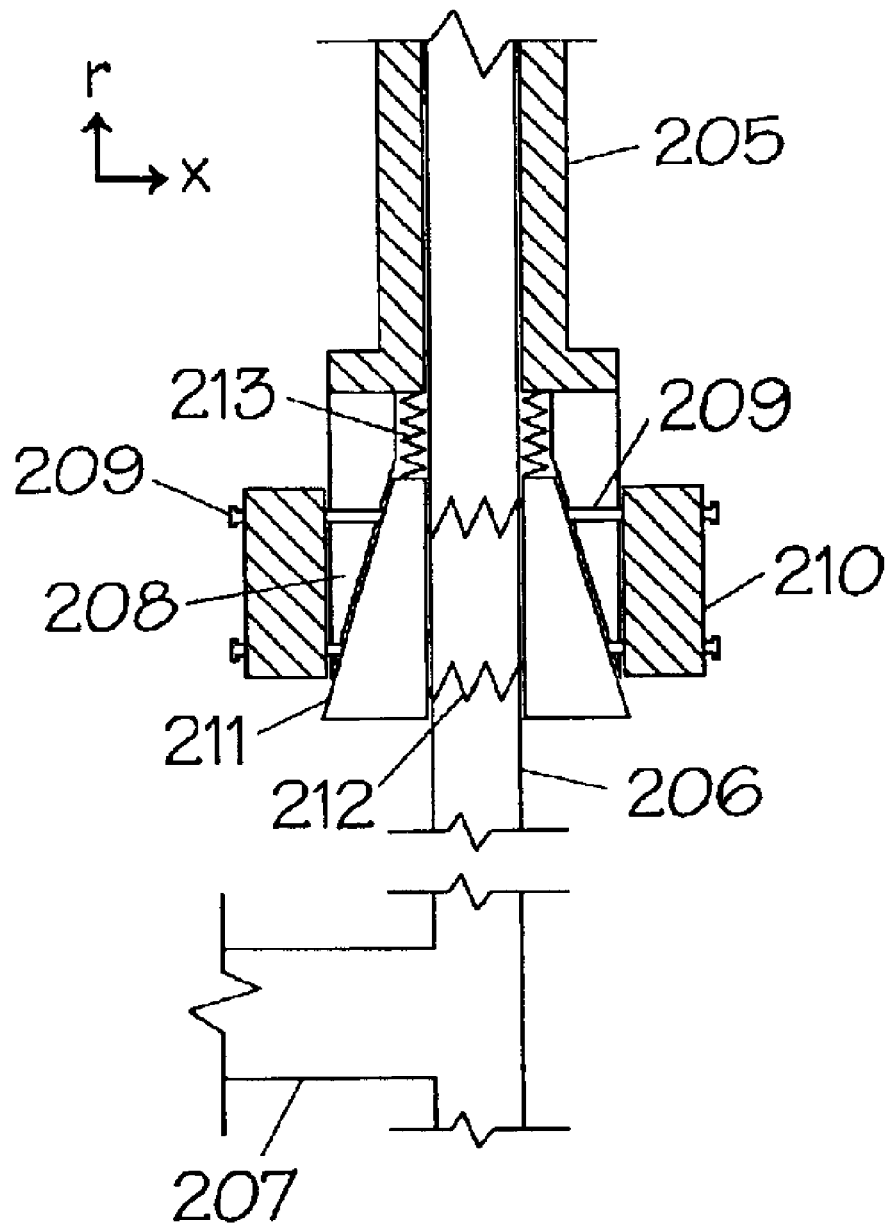
FIG. 15 is a partially cut-away side view of a certain presently preferred embodiment of a wedge-type lock for an extender according to this invention.
Figure 16:
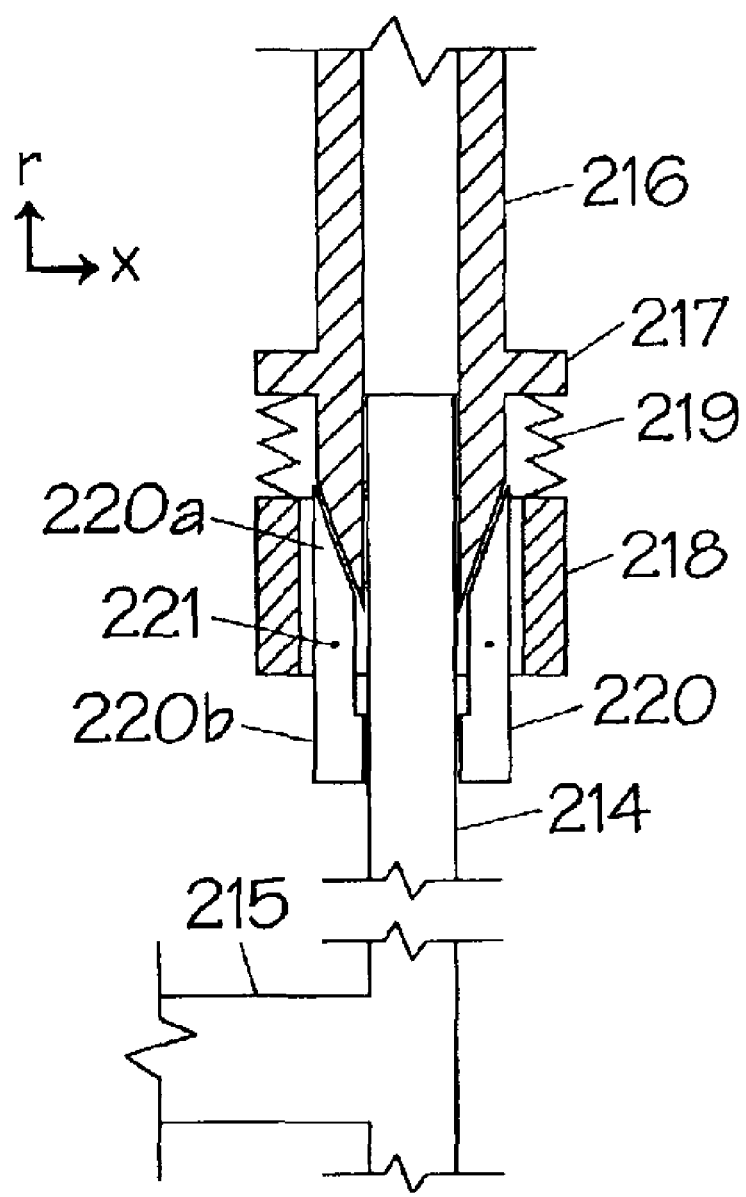
FIG. 16 is a partially cut-away side view of a certain presently preferred embodiment of a clasp-type lock for an extender according to this invention.

In FIGS. 11a and 11b, drive shaft 161 is cylindrical and has slots 162 that extend in an x-axis direction through which pass rods 163. Mounted within drive shaft 161 and coaxial therewith is dual screw 164, which has a right-handed screw on one half and a left-handed screw on the other half. (Only one screw is required, but a dual screw is sturdier.) Screw 164 can be rotated in either direction by motor 165. Nuts 166 engage screw 164 and rods 163 connect nuts 166 to slides 167 which ride over posts 168, which are fixed to drive shaft 161. Each slide 167 is connected to shaft portion 169 of a module by springs 170. In operation, as drive shaft 161 rotates, screw 164 and the shaft of motor 165 rotate with it. By increasing or decreasing the speed of motor 165 relative to drive shaft 161, slides 167 can be moved away from or towards drive shaft 161. When the chain is engaged and shaft portion 169 is locked, this compresses or extends springs 170. (Shaft portion 169 can be locked by a mechanism such as shown in FIGS. 15 or 16.) Then, when the chain is not engaged, the lock is opened and springs 170 move shaft portion 169 away from or towards drive shaft 161.

Figure 12:
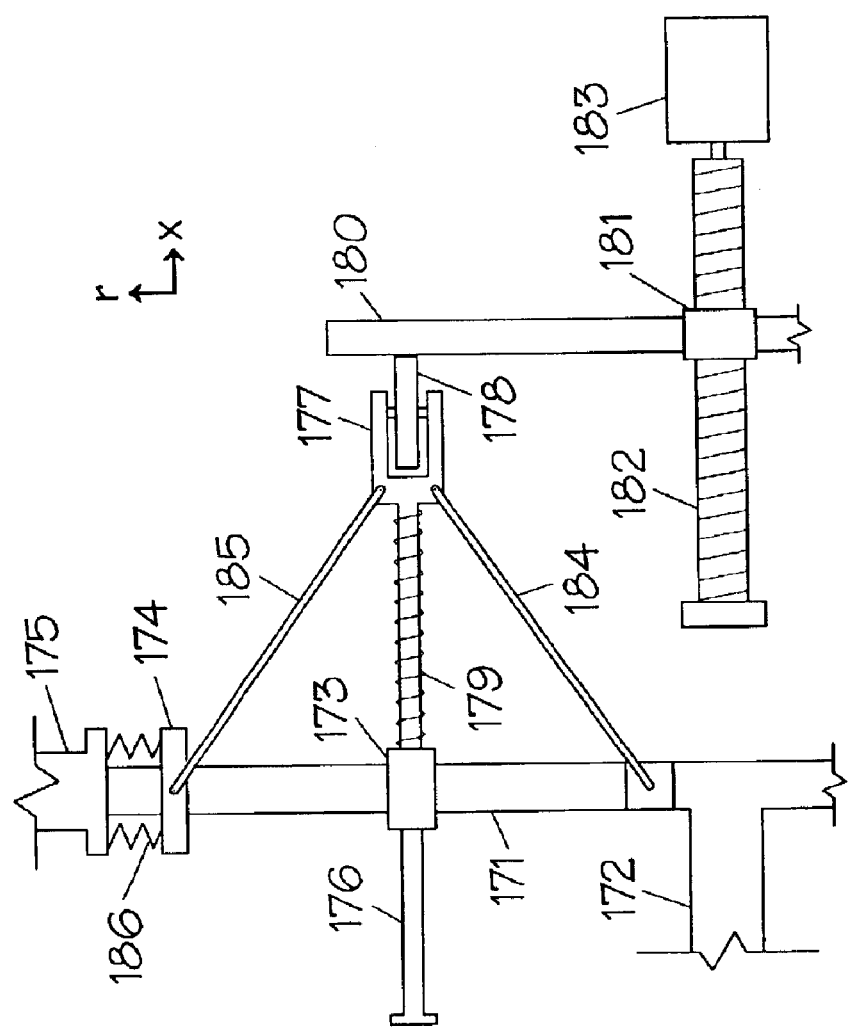
FIG. 12 is a side view of still another certain presently preferred embodiment of an extender according to this invention.

In FIG. 12, post 171 is fixed to drive shaft 172. Slides 173 and 174 and shaft portion 175 ride over post 171. Through an aperture in slide 173 passes rod 176, which has fork 177 at one end which holds rotatable wheel 178. Spring 179 biases wheel 178 towards non-rotating disc 180. Disc 180 is fixed to nut 181, which is threadedly engaged with screw 182, which is coaxial with drive shaft 172. Motor 183 can turn screw 182 in either direction. Rod 184 is rotatably attached between fork 177 and post 171, and rod 185 is rotatably attached between fork 177 and slide 174. Springs 186 join slide 174 to shaft portion 175. As drive shaft 172 rotates, motor 183 moves disc 180 toward or away from wheel 178. If disc 180 pushes wheel 178 towards post 171, springs 186 are compressed. Then, when shaft portion 175 is unlocked (see FIGS. 15 and 16 for examples of locks), springs 186 push shaft portion 175 away from drive shaft 172. If disc 180 is moved away from wheel 178, spring 179 pushes wheel 178 away from post 171 and extends springs 186. Then, when shaft portion 175 is unlocked, springs 186 pull shaft portion 175 towards drive shaft 172.

Figure 13:
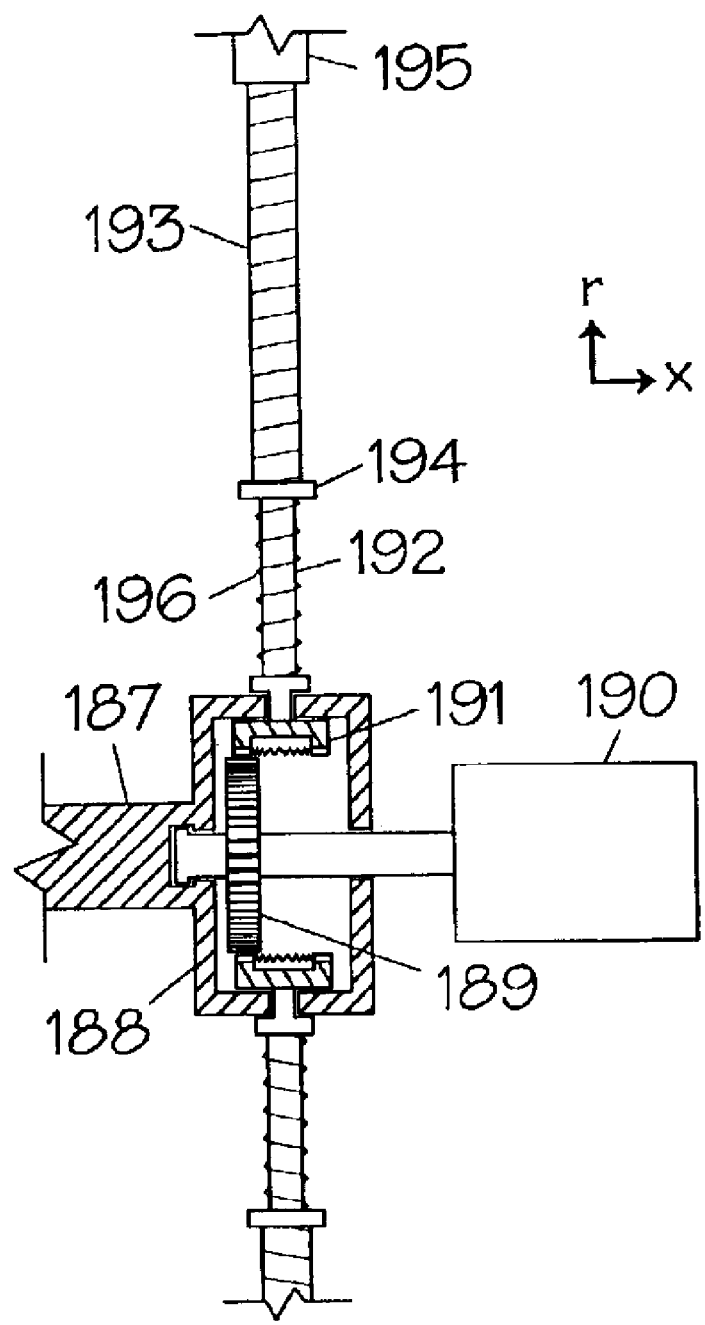
FIG. 13 is a partially cut-away side view of yet another certain presently preferred embodiment of an extender according to this invention.

In FIG. 13, drive shaft 187 is provided with housing 188 at one end. Housing 188 holds large gear 189, which is mounted on the shaft of a motor 190. Large gear 189 rotates with drive shaft 187 except when the distance between drive shaft 187 and the module is being changed. Smaller gear 191, fixed to one end of post 192, engages large gear 189 at a 90 E angle. Screw 193 is fixed to nut 194, which can turn, but cannot move in a radial direction. The other end of screw 193 is treadedly engaged with end portion 195 of a module. Screw 193 is locked (see FIGS. 15 and 16 for examples of locks), except when the module does not engage the chain. Spring 196, which rides loosely over post 192, is attached at one end to post 192 and at the other end to nut 194. The distance between a module and drive shaft 187 is increased or decreased when motor 190 rotates large gear 189 slightly faster or slower than drive shaft 187, which twists or untwists spring 196. When screw 193 is unlocked, spring 196 will turn screw 193 in a clockwise or counterclockwise direction, moving shaft portion 195 in a radial direction, thereby increasing or decreasing the distance between the module and drive shaft 187.

Figure 14:
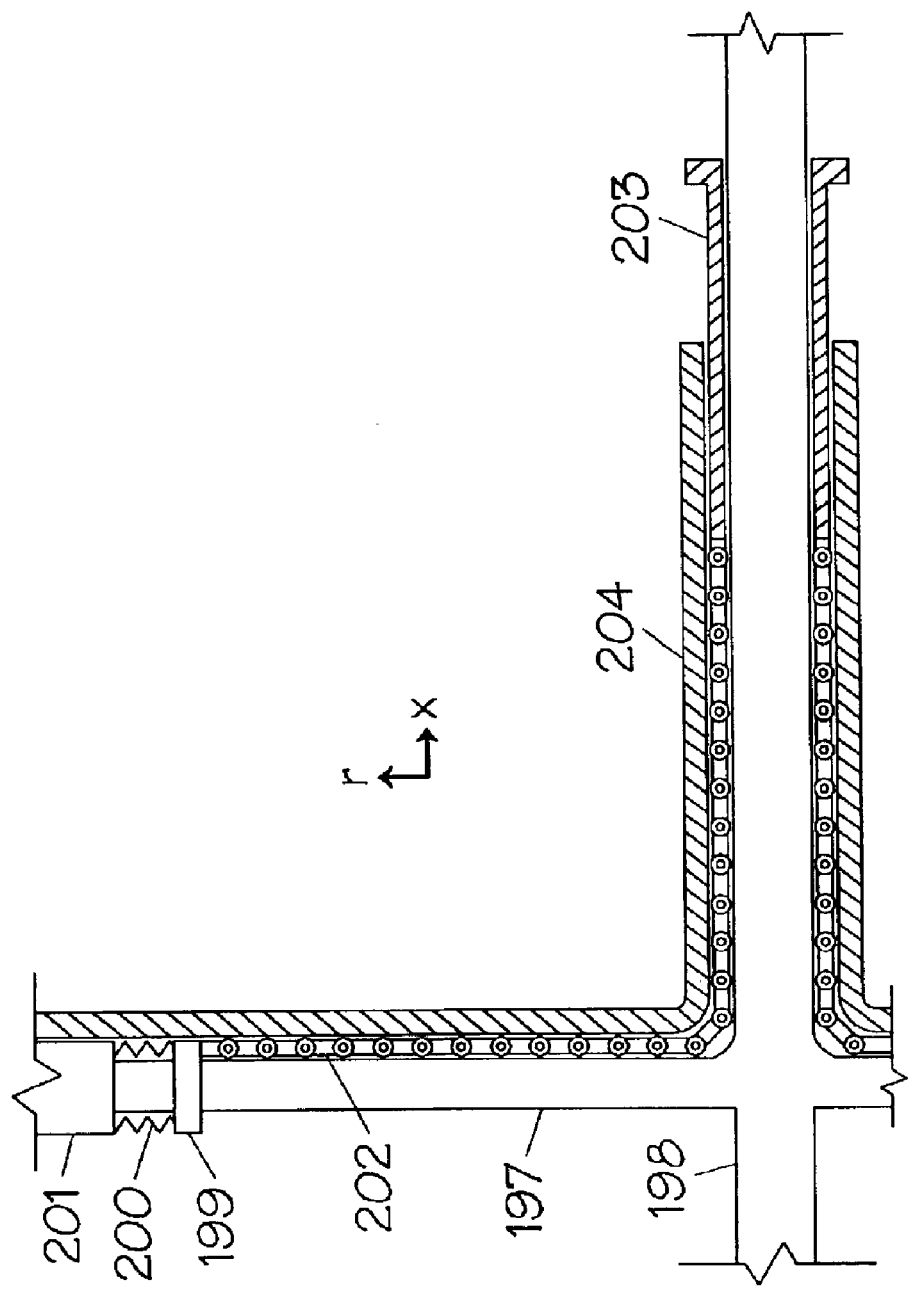
FIG. 14 is a partially cut-away side view of still another certain presently preferred embodiment of an extender according to this invention.

In FIG. 14, post 197 is fixed to drive shaft 198. A slide 199 rides over post 197 and is connected by springs 200 to the base of module shaft portion 201, which also rides over post 197. Also attached to slide 199 is one end of chain 202, the other end of which is attached to elongated rod 203, which rides over drive shaft 198. The links in chain 202 have stops on them (not shown) so that the links can turn from 0° (i.e., lined up) to about 45° (at the bend between drive shaft 198 and post 197), but cannot turn more in either direction. Guide 204 confines chain 202 to movement between drive shaft 198 and guide 204 and also between post 197 and guide 204. Moving rod 203 in an x-axis direction moves chain 202 in x-axis and radial directions and causes chain 202 to raise or lower slide 199, compressing or extending springs 200. When shaft portion 201 is unlocked (see FIGS. 15 and 16 for examples of locks), springs 200 raise or lower shaft portion 201, thereby increasing or decreasing the distance from the module to drive shaft 198. In FIG. 14, the rods 203 for each chain 202 are moved together, but they could also be moved individually when the chain is not engaged, and then the chain 202 could be attached directly to shaft portion 201.

Extender Locks

To ensure that the distance between a module and the drive shaft changes only when the chain is not engaged, the extender is locked when the chain is engaged and is unlocked when the chain is not engaged. The extender can be unlocked when it is within the angle formed by the point that the chain begins to be engaged by the modules, the center of the drive shaft, and the point that the chain disengages from the modules, as in FIGS. 6 to 8 and 10. In FIG. 9, guide wheels 127 prevent the distance from where the chain engages the blade to the drive shaft from changing except when the chain is not engaged. Alternatively, the pressure of the chain against the module, and the absence of that pressure, can lock and unlock an extender, respectively, as is illustrated in FIGS. 15 and 16. The locks shown in FIGS. 15 and 16 can be used with the extenders shown in FIGS. 11 to 14, where energy is stored by the extender when the chain is engaged, and then that energy is released to change the distance between the module and the drive shaft when the chain is not engaged.

FIG. 15 illustrates a wedge-type lock that can be used to prevent the distance from the chain to the drive shaft from changing except when the chain is not engaged. In FIG. 15, square shaft portion 205 of a module rides over square post 206, which is connected to drive shaft 207. Shaft portion 205 terminates in two wedges 208 which extend between four pins 209, slide 210, which is a ring around post 206, and grips 211. Pins 209 are fixed to grips 211 and can slide through apertures in slide 210. Springs 212, on either side of post 206, force grips 211 apart. Springs 213 force grips 211 and shaft portion 205 apart and prevent slide 210 from separating from shaft portion 205. When the teeth supported by the module engage the chain, shaft portion 205 of the module is forced towards drive shaft 207, jamming wedges 208 between slide 210 and grips 211, forcing grips 211 against post 206, thereby locking slide 210. When the teeth are no longer engaged by the chain, springs 213 force shaft portion 205 away from slide 210 and slide 210 is unlocked.

FIG. 16 illustrates a clasp-type of lock that can be used to prevent the distance from the chain to the drive shaft from changing except when the chain is not engaged. In FIG. 16, square post 214 is connected to drive shaft 215 and square shaft portion 216 rides over post 214. The end of shaft portion 216 is pointed and there are two steps 217 near the end of shaft portion 216. A slide 218 (a ring around post 214) also rides over post 214 and is connected to steps 217 by springs 219. Inside slide 218 are mounted two opposing levers 220 that pivot on pins 221; levers 220 have action arms 220a and clasping arms 220b. When the teeth of a module engage the chain, shaft portion 216 is forced towards drive shaft 215 and the pointed ends of shaft portion 216 force active arms 220a apart, causing clasping arms 220b to grip post 214, thereby preventing slide 218 from moving along post 214. When the teeth no longer engage the chain, springs 219 force shaft portion 216 away from slide 218. Slide 218 and shaft portion 216 can then move toward or away from drive shaft 215.

To use the lock of FIG. 15 with the extender of FIG. 11, for example, the slides 167, springs 170, and shaft portion 169 shown in FIG. 11 would be replaced by the slide 210, springs 213, and shaft portion 205 shown in FIG. 15. To use the lock of FIG. 16 with the extender of FIG. 12, for example, the slide 174, springs 186, and shaft portion 175 shown in FIG. 12 would be replaced by the slide 218, springs 219, and shaft portion 216 shown in FIG. 16. To use the lock of FIG. 15 with the extender of FIG. 13, for example, the shaft portion 195 of FIG. 13 would loosely engage the treads of screw 193, to permit a small movement in the radial direction, and would be fitted with slide 210, grips 211, and wedges 208 of FIG. 15. Also, slide 210 of FIG. 15 would threadedly engage screw 193. To use the lock of FIG. 16 with the extender of FIG. 14, for example, the slide 199, springs 200, and shaft portion 201 of FIG. 14 would be replaced by the slide 218, springs 219, and shaft portion 216 of FIG. 16.

As the drawings illustrate, many variations on the principles of this invention are possible. With reference to the embodiments where the chain-engaging means is a tooth (or teeth), at least one tooth per module is needed, but more are preferred for a surer grip on the chain. Unless at least three modules are used, the chain may bounce up and down too much, though two modules may be satisfactory at low speeds. An odd number of modules, particularly five, is preferred because that minimizes fluctuations in the effective diameter of the drive wheel as it rotates. The radial axes of the modules are preferably evenly spaced, 360/n degrees apart, where n is the number of modules. It is also possible to connect by chains two or more drive wheels according to this invention to obtain a greater range of transmission ratios.

What is claimed is:

1. A drive wheel for pulling a chain therearound comprising
   (A) a drive shaft with its longitudinal axis in an x-axis direction;
   (B) at least two chain-engaging means positioned around said drive shaft for engaging said chain, each on a radial axis that extends from said drive shaft;
   (C) modules that support said chain-engaging means and permit each of said chain-engaging means to move in a circumferential direction relative to its radial axis a distance sufficient to engage said chain;
   (D) module locks that prevent a each of said chain-engaging means from moving relative to its radial axis when it engages said chain, but permit such movement when it does not engage said chain;
   (E) extenders connecting said modules to said drive shaft that change the distance between a module and said drive shaft while said drive shaft is rotating; and
   (F) at least one extender lock that prevents said extenders from changing the distance between a module and said drive shaft when a chain is engaged by the chain-engaging means supported by that a module, but permit such change when said chain is not so engaged.

2. A wheel according to claim 1 wherein said chain-engaging means comprises at least one radially-extending tooth having at least one sloping side and a shelf on each side of said at least one tooth for supporting said chain.

3. A wheel according to claim 2 wherein said module has (A) an end portion that supports said at least one tooth and can move said at least one tooth in a circumferential direction away from its radial axis, (B) a shaft portion connected to said end portion and to said extender, and (C) at least one spring that biases said end portion to return said at least one tooth to its radial axis.

4. A wheel according to claim 3 wherein said end portion is rotatably mounted on said shaft portion and said module lock comprises a wedge on said end portion that is forced into a corresponding groove in said shaft portion by the pressure of said chain, and where a spring forces said end portion out of said groove when said chain does not engage said at least one tooth.

5. A wheel according to claim 3 wherein said end portion is rotatably mounted on said shaft portion and said module lock comprises two opposing levers on pivots on said shaft portion, each lever having a clasping arm and active arm, whereby separating the active arms of said levers causes said clasping arms to move together, where said end portion extends between said levers, whereby when said at least one tooth engages said chain, said chain forces said end portion to move towards said drive shaft, forcing said active arms to separate and said clasping arms to grip said end portion, preventing its movement, and where a spring forces said end portion away from said shaft portion when said chain is not engaged.

6. A wheel according to claim 1 wherein the force of said chain against said chain-engaging means first causes said chain-engaging means to move in a circumferential direction and then causes a module lock to prevent such movement.

7. A wheel according to claim 1 wherein said extender comprises (A) a radially-extending member that is connected to said chain-engaging means and that is slidably engaged with a radially-extending post attached to said drive shaft, and (B) a diagonal rod moveable in said x-axis direction that is slidably engaged with said member, whereby moving said diagonal rod in said x-axis direction changes the distance between said chain-engaging means and said drive shaft.

8. A wheel according to claim 1 wherein said extender comprises (A) a radially-extending screw, one end of which is threadedly engaged with a radially-extending member that is connected to said chain-engaging means and the other end of which is fixed to a gear that is rotatably attached to said drive shaft, and (B) a toothed control rod that is aligned with said drive shaft and engages said gear, whereby moving said control rod in said x-axis direction rotates said radially-extending screw which changes the distance between said chain-engaging means and said drive shaft.

9. A wheel according to claim 1 wherein said extender comprises (A) a radially-extending member that is connected to said chain-engaging means and that is slideably engaged with a radially-extending post that is attached to said drive shaft, (B) a spring biasing said member towards said drive shaft, (C) a wheel mounted on an axle that extends from said member in said x-axis direction, and (D) a non-rotating plate that extends in a circumferential direction and contacts said wheel as said drive shaft rotates, whereby when said chain is not engaged (1) said spring pulls said member toward said drive shaft until said wheel contacts said plate or (2) said plate contacts said wheel and moves said wheel and said member away from said drive shaft.

10. A wheel according to claim 1 wherein said modules are part of a cone coaxial with said drive shaft, said chain-engaging means is at least two blades, and said extender comprises a guide for keeping said chain in a fixed x-axis position and means for moving said cone in an x-axis direction.

11. A wheel according to claim 1 wherein said extender comprises (A) a radially-extending cylinder one end of which is fixed to said drive shaft, (B) a circular nut that is rotatably mounted on the other end of said cylinder and that has teeth around its perimeter, (C) a screw threadedly engaged by said nut that extends inside said cylinder and is rotatably connected to a radially-extending member that is connected to said chain-engaging means, and (D) a motor having a gear attached to its shaft that engages the teeth around said perimeter of said nut, whereby the rotation of the shaft of said motor moves said chain-engaging means towards or away from said drive shaft.

12. A wheel according to claim 1 wherein said drive shaft is cylindrical and has longitudinal slots, where said extender comprises (A) a radially-extending post, one end of which is attached to said drive shaft, (B) a screw inside and coaxial with said drive shaft, (C) a nut threadedly engaged by said screw, (D) a slide that is slideably engaged with said post and is connected to a radially-extending member that is connected to said chain-engaging means, (E) a rod rotatably connected to said nut and to said slide, and (F) means for rotating said screw faster, slower, or at the same speed as said drive shaft.

13. A wheel according to claim 1 wherein said extender comprises (A) a radially-extending post, one end of which is attached to said drive shaft, (B) a first slide that slideably engages the other end of said post and that is connected to a radially-extending member that is connected to said chain-extending means, (C) a second slide that slideably engages said post in between said first slide and said drive shaft, (D) a first rod that extends in said x-axis direction that is slideably engaged with said second slide and that has a wheel at one end rotatably mounted on an axle aligned in a radial direction, (E) a second rod rotatably attached to said first slide and to said one end of said first rod, (F) a spring biasing said wheel away from said post, and (G) a non-rotating disc that extends in a plane normal to said x-axis direction, is moveable in said x-axis direction, and contacts said wheel when said chain is not engaged, whereby when said chain is not engaged said spring moves said wheel away from said post until said wheel contacts said disc or said disc moves said wheel towards said post.

14. A wheel according to claim 1 wherein one end of said drive shaft houses a first gear mounted on a control shaft coaxial with said drive shaft and at least two second gears that are smaller than said first gear engage said first gear at 90° thereto, each fixed to a radially-extending post, where a radially-extending member connected to said chain-engaging means is threadedly engaged with a radially-extending screw that has a nut fixed thereto and a spring loosely encompasses said rod, one end of which is attached to said nut and the other end of which is attached to said rod, whereby rotating said control shaft at a speed greater than or less than the speed of said drive shaft changes the distance between said drive shaft and said chain-engaging means.

15. A wheel according to claim 1 wherein said extender comprises (A) a radially-extending post one end of which is attached to said drive shaft, (B) a slide that is slideably engaged with said post and that is connected to said chain-engaging means, (C) a chain one end of which is attached to said slide and the other end of which is attached to a rigid member moveable along said drive shaft, and (D) a guide for confining said chain to a space between said guide and said drive shaft and between said guide and said post, whereby moving said rigid member along said drive shaft moves said chain-engaging means in a radial direction.

16. A wheel according to claim 1 wherein said chain exerts an axially-directed force against said chain-engaging means and the presence of said force closes said extender locks and the absence of said force opens them.

17. A wheel according to claim 1 wherein said extender lock is opened by said extender moving pass a point where said chain is not engaged and is closed by said extender moving pass a point where said chain is engaged.

18. A transmission comprising
    (A) the drive wheel according to claim 1;
    (B) a sprocket wheel on an axle parallel to said drive shaft; and
    (C) the chain engaged by said drive wheel and said sprocket wheel.

19. A drive wheel for pulling a chain having rollers connected by links comprising (A) a drive shaft with its longitudinal axis in an x-axis direction;
(B) at least three modules evenly positioned around said drive shaft, where each module (1) supports at least one radially-extending, chain-engaging, pointed tooth having a shelf on either side, where said at least one tooth is on a radial axis that extends from said drive shaft when said at least one tooth is not in contact with a roller, (2) moves said at least one tooth in a circumferential direction away from its radial axis when said tooth is contacted by a roller, and (3) returns said at least one tooth to its radial axis when said tooth does not engage said chain;
(C) a module lock that prevents said module from moving said at least one tooth relative to its radial axis when a roller on said chain forces said shelf towards said drive shaft;
(D) extenders connecting each module to said drive shaft, where each extender can independently change the distance between said drive shaft and the module connected to it when the at least one tooth supported by that module does not engage said chain; and
(E) an extender lock that prevents each of said extenders from changing said distance when a roller on said chain presses against said shelf.

20. A drive wheel for pulling a chain having rollers connected by links comprising
(A) a drive shaft with its longitudinal axis in an x-axis direction;
(B) at least three modules evenly positioned around said drive shaft, where each module (1) supports at least one radially-extending, chain-engaging, pointed tooth having a shelf on either side, where said at least one tooth is on a radial axis that extends from said drive shaft when said at least one tooth is not in contact with a roller, (2) moves said at least one tooth in a circumferential direction away from its radial axis when said tooth is contacted by a roller, and (3) returns said at least one tooth to its radial axis when said tooth does not engage said chain;
(C) a module lock that prevents said module from moving said at least one tooth relative to its radial axis when a roller on said chain forces said shelf towards said drive shaft;
(D) extenders connecting each module to said drive shaft, where each extender can change the distance between said drive shaft and said module when said at least one tooth does not engage said chain;
(E) means for storing energy in each of said extenders when said chain is engaged by the chain-engaging means supported by the module connected to said extender; and
(F) an extender lock that prevents the release of said energy to change said distance when a roller on said chain presses against said shelf and permits the release of said energy to change said distance when a roller on said chain does not press against said shelf.

* * * * *